(12) United States Patent
Crutchfield et al.

(10) Patent No.: US 10,257,649 B2
(45) Date of Patent: Apr. 9, 2019

(54) APPARATUS, SYSTEMS AND METHODS FOR VISUALLY CONNECTING PEOPLE

(71) Applicant: Flaregun Inc., Agoura Hills, CA (US)

(72) Inventors: Keith Crutchfield, Stone Mountain, GA (US); Kris Cadle, Agoura Hills, CA (US)

(*) Notice: Subject to any disclaimer, the term of this patent is extended or adjusted under 35 U.S.C. 154(b) by 0 days.

(21) Appl. No.: 15/665,225

(22) Filed: Jul. 31, 2017

(65) Prior Publication Data
US 2017/0359690 A1    Dec. 14, 2017

Related U.S. Application Data

(63) Continuation-in-part of application No. 15/134,334, filed on Apr. 20, 2016, now Pat. No. 9,743,244.

(51) Int. Cl.
| | |
|---|---|
| *H04W 4/02* | (2018.01) |
| *G06F 3/14* | (2006.01) |
| *G06F 3/16* | (2006.01) |
| *G06F 1/16* | (2006.01) |
| *G06F 3/01* | (2006.01) |
| *G06F 3/03* | (2006.01) |
| *G06F 3/0481* | (2013.01) |
| *G06Q 50/00* | (2012.01) |

(Continued)

(52) U.S. Cl.
CPC .......... *H04W 4/023* (2013.01); *G06F 1/1686* (2013.01); *G06F 3/011* (2013.01); *G06F 3/0304* (2013.01); *G06F 3/0481* (2013.01); *G06F 3/04815* (2013.01); *G06F 3/14* (2013.01); *G06F 3/167* (2013.01); *G06Q 50/01* (2013.01); *H04W 4/026* (2013.01); *H04W 4/029* (2018.02); *H04W 4/08* (2013.01); *H04M 2250/10* (2013.01); *H04M 2250/12* (2013.01); *H04M 2250/52* (2013.01)

(58) Field of Classification Search
None
See application file for complete search history.

(56) References Cited

U.S. PATENT DOCUMENTS

| | | | | |
|---|---|---|---|---|
| 8,284,748 B2* | 10/2012 | Borghei | ............... | H04W 4/021 370/338 |
| 8,989,778 B2* | 3/2015 | Altman | ............... | H04W 4/029 455/456.3 |
| 9,420,423 B1* | 8/2016 | Mendelson | ............. | H04W 4/90 |

(Continued)

*Primary Examiner* — Hilina K Demeter
(74) *Attorney, Agent, or Firm* — CIONCA IP Law P.C.; Marin Cionca

(57) ABSTRACT

A method for visually finding people with minimized network data usage, operable on a computing system including a mobile device having a processor, a display and a camera, having the steps: downloading to the mobile device an application for visually connecting people, configured for minimized network data usage by having a set of preloaded graphics and configured to receive from a server a first set of graphic codes having instructions for displaying a graphic of the set of preloaded graphics; receiving the first set detecting a location of a user; sending a second set of graphic codes via the server to another user; detecting, by performing a live scanning of the user's surroundings, a location of a group member; displaying a live image and a representation of the group member's location, the representation being the graphic as instructed by the first set without further contact with the server.

14 Claims, 30 Drawing Sheets

(51) Int. Cl.
*H04W 4/08* (2009.01)
*H04W 4/029* (2018.01)

(56) References Cited

U.S. PATENT DOCUMENTS

| | | | | |
|---|---|---|---|---|
| 9,743,229 | B2* | 8/2017 | Moldaysky | G06Q 30/02 |
| 2008/0036653 | A1* | 2/2008 | Huston | G01S 19/14 |
| | | | | 342/357.52 |
| 2011/0037712 | A1* | 2/2011 | Kim | H04M 1/7253 |
| | | | | 345/173 |
| 2012/0284638 | A1* | 11/2012 | Cutler | G06Q 10/00 |
| | | | | 715/751 |
| 2013/0072221 | A1* | 3/2013 | Chen | H04W 4/14 |
| | | | | 455/456.1 |
| 2013/0102257 | A1* | 4/2013 | Bedi | H04W 4/023 |
| | | | | 455/66.1 |
| 2014/0106710 | A1* | 4/2014 | Rodriguez | H04M 1/7253 |
| | | | | 455/411 |
| 2014/0152869 | A1* | 6/2014 | Solotko | G06Q 10/10 |
| | | | | 348/231.3 |
| 2016/0345129 | A1* | 11/2016 | Lee | H04W 4/023 |

* cited by examiner 419c    419

419a    419b

409db

409dc

435

436

APPARATUS, SYSTEMS AND METHODS FOR VISUALLY CONNECTING PEOPLE

CROSS-REFERENCE TO RELATED APPLICATIONS

This application is a continuation-in-part and claims the benefit of U.S. Non-Provisional application Ser. No. 15/134,334, filed Apr. 20, 2016, which is hereby incorporated by reference, to the extent that it is not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

1. Field of the Invention

The invention relates generally to mobile technology and more particularly to an apparatus, system and methods for visually connecting people in real time.

2. Description of the Related Art

Oftentimes, people participate in large and crowded events (e.g., music festivals, sporting events, etc.) or activities that take place in large spaces such as a mall, theme park, college campus, and so on. A problem the participants are facing is getting lost or separated from the group they are part of (e.g., family, friends group, etc.). Another problem is that the participants have limited options of socially interacting with their group while at these events. Thus, there is a need for a new apparatus, system and methods for visually connecting people, to solve the above problems.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, apparatus, systems and methods are disclosed herein which are designed to visually connect groups of friends, families and colleagues in large crowded environments like music festivals, theme parks, sporting events, conventions, etc. The core function is achieved through an algorithm of augmented reality, 3D GPS mapping and other specialized technologies, as disclosed herein. They allow users to privately view, in real time and 3D space, the precise location of each friend by displaying a profile icon on the screen of their mobile device. As such they enhance the user's experience at these events for example by reducing the anxiety of getting separated or lost.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
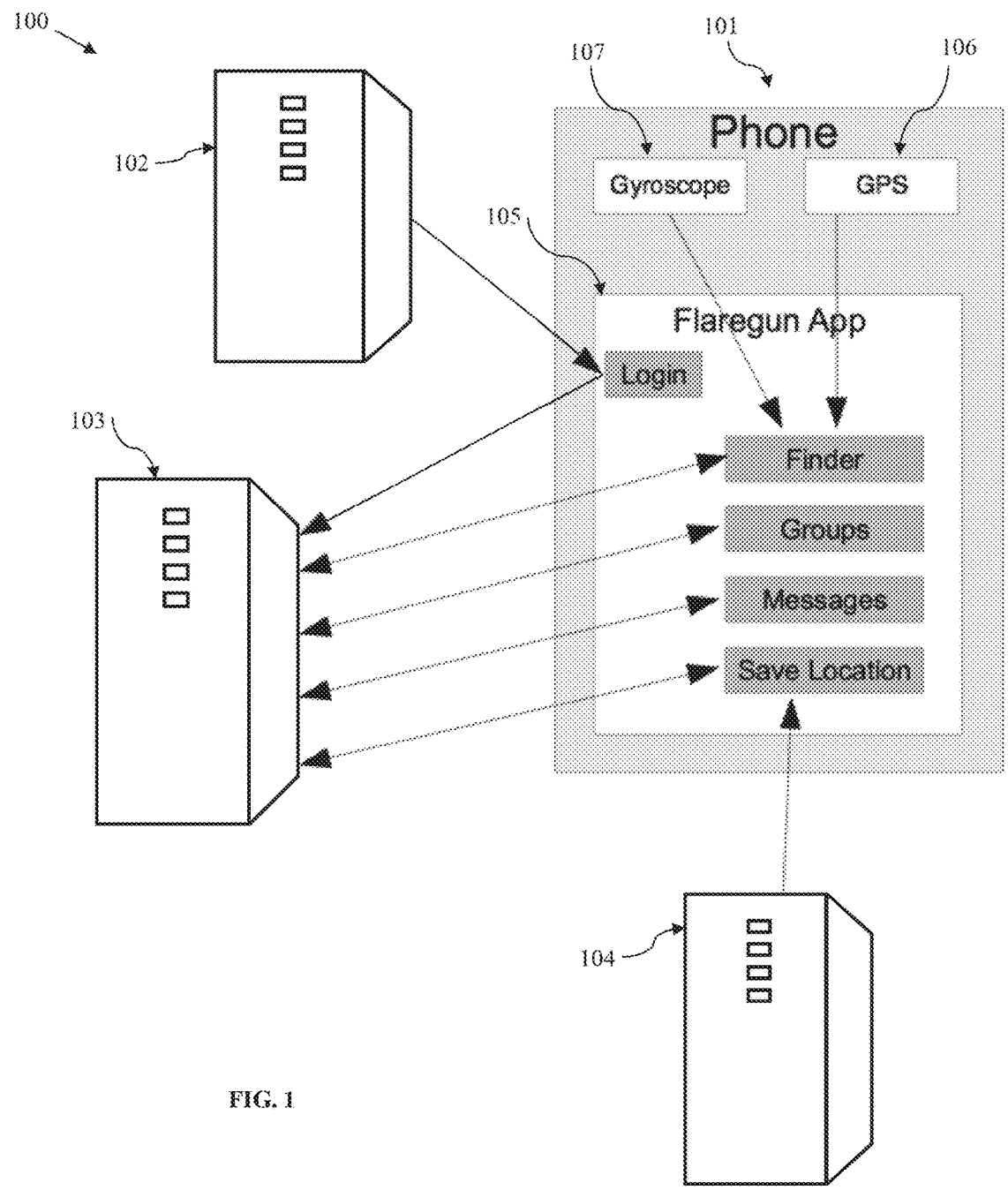
FIG. 1 illustrates a diagrammatic view of a system for visually connecting people, according to an embodiment.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

As used herein and throughout this disclosure, the term "mobile device" refers to any electronic device capable of communicating across a mobile network. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). A transceiver includes but is not limited to cellular, GPRS, Bluetooth, and Wi-Fi transceivers.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a cellular network. A "network" can include broadband wide-area networks, local-area networks, and personal area networks. Communication across a network can be packet-based or use radio and frequency/amplitude modulations using appropriate analog-digital-analog converters and other elements. Examples of radio networks include GSM, CDMA, Wi-Fi and BLUETOOTH® networks, with communication being enabled by transceivers. A network typically includes a plurality of elements such as servers that host logic for performing tasks on the network. Servers may be placed at several logical points on the network. Servers may further be in communication with databases and can enable communication devices to access the contents of a database. For instance, an authentication server hosts or is in communication with a database having authentication information for users of a mobile network. A "user account" may include several attributes for a particular user, including a unique identifier of the mobile device(s) owned by the user, relationships with other users, call data records, bank account information, etc. A billing server may host a user account for the user to which value is added or removed based on the user's usage of services. One of these services includes mobile payment. In exemplary mobile payment systems, a user account hosted at a billing server is debited or credited based upon transactions performed by a user using their mobile device as a payment method.

For the following description, it can be assumed that most correspondingly labeled elements across the figures (e.g., 101 and 401, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a diagrammatic view of a system 100 for visually connecting people, according to an embodiment. As shown, the system 100 may include several servers, which may be connected to a network, such as the internet. A mobile device 101, such as a smart phone (e.g., iPhone®), may be used by a user to connect to the system's servers and to perform the functions related to visually connecting with people, as will be described hereinafter.

The server 102 may, for example, be an API server of a social media site, such as Facebook™, and may be used to enable the user to login to the visual connection application ("application,") disclosed herein, by using the login credentials of the user for the respective social media site. An advantage of using such an application login is that it gives the user the option of pulling friends lists, photos or other data into the application. Alternatively, the user may create a login profile and then login using a visual connection server ("application server") 103, which may be dedicated to run the application's server portion ("server application"), in the form of an application or website, for example.

The visual connection application may contain mobile device logic 105 ("Flaregun app", "mobile device app"), which may be downloadable by a user into their mobile device 101, and server logic ("server application"), that will typically be preinstalled on the visual connection server 103. As shown, the Flaregun app 105 may be configured to communicate with the application server 103 and other servers (102 and 104) to enable the mobile device 101 to perform the functions related to visually connecting with people, as will be described hereinafter. In addition, the mobile device app 105 may communicate with the social media server 102 for the purposes described above.

The mobile device app 105 may also communicate with a location server 104, such as a Google™ Maps API server, to support the bird's eye view of the mobile device 101.

The mobile device 101, may be equipped with a GPS module 106 to determine the position (e.g., longitude and latitude) and a gyroscope sensor 107 to determine the orientation (e.g., yaw, pitch, and roll) of the mobile device 101 and its camera (not shown), which may be needed for operation of the application as will be described in more details later herein.

Other sensors may be used in addition to or in combination with the gyroscope and the GPS module, such as an accelerometer or a compass, to determine the position and/or orientation of the mobile device 101.

The mobile device app 105 may use various buttons to enable a user to operate the application and employ its functions. Some example buttons are shown in FIG. 1: "Login", "Finder", "Groups", "Messages" and "Save Location." Other example buttons will be shown and described when referring to the subsequent figures.

A "Finder" button for example may be used to launch the scope mode, the function and purpose of which will be described later herein. The functions associated with "Groups" and "Messages" buttons will also be described later herein when referring to some of the subsequent figures.

A "Save Location" button may be used typically in bird's eye view, when a graphic pin or icon may be displayed on a map (e.g., Google™ Maps, provided by location server 104) representing the current location/position of the user. When actuating this button, the current location of the user is saved on the map. This function may be useful in several instances. For example, a user may save a current location when parking a car in a large parking lot. Later, when returning to the car, the user could easily find the parked car by walking in the direction of the previously saved location pin or icon. The application may be configured to give the option to the user to name/label the saved location (e.g., "Car Location") by typing the respective name in a text box. Further, more than one location may be saved and labeled.

An augmented reality (AR) module is preferably built into the application and may be downloaded with the mobile device app 105 and may be configured to run on the mobile device 101.

Preferably, the application server 103 stores all user groups that were created by different users. For every user, the user's latest position (e.g., GPS location) may be stored on application server 103, preferably at login. User's GPS location is then preferably updated periodically (e.g., one time per second), by user's mobile device 101. Each time user's mobile device GPS 106 notifies the application of a location update, the location data is preferably being sent to and stored on the application server 103. When a user goes into the group section ("Groups" or "My Groups") of the mobile device app 105, and then selects a group from the shown group list (see FIGS. 5-6), a list of users/members in that group is preferably loaded into the user's mobile device 101, with their most recent coordinates (e.g., latitude and longitude). Those group users/members are preferably shown in scope mode using the augmented reality module (see for example FIG. 32).

Figure 32:
FIG. 32 illustrates an example of use of an apparatus and method for visually connecting people, according to an embodiment.

Even if those group users/members are not in the visual proximity, as seen in FIG. 32 for example, of the user and of her mobile device 101, because they are many miles away, or because, if they are nearby, there is an obstruction that blocks the view (e.g., a wall, a building, a hill, etc), the information about those group members/users may still be displayed on user's mobile device in scope when scanning around, from left to right for example. Such information may include the group member's name, photograph, current location and/or distance. For example, if the user of the mobile device 101 is in Orange County, Calif., and sets her mobile device in scope mode, the group members/users (e.g., user's friends) will preferably still show up in scope view, when the mobile device is pointed in the direction where the respective friend is at that time (e.g., when the mobile device is pointed in the direction of Los Angeles, this information may be shown: John Doe, Los Angeles, 25 miles, or, John Doe, Los Angeles, 34.0500° N, 118.2500° W, 25 miles). Thus, the user's mobile device's camera may not need to actually see the physical location of the group member (e.g., the actual street in Los Angeles), such as when the group member is far away; it needs only to be pointed in that direction, and location and other information about that group member may still be displayed in scope. Similarly, same group members/users and information about them may also be seen in the bird's eye view, depending on the view range the user has set.

Thus, the users who wish to use the application, including the users who wish to be shown/located in scope view, would typically need to establish server connection, via the internet for example, be logged into the application and have the GPS function 106 enabled on their mobile device 101. However, alternatives technologies, such as multipeer technology, may potentially be used to achieve similar results.

Preferably, the data about the groups, users, their location, etc., is stored on application server 103 and then loaded by the user mobile devices 101 that need it.

Figure 2:
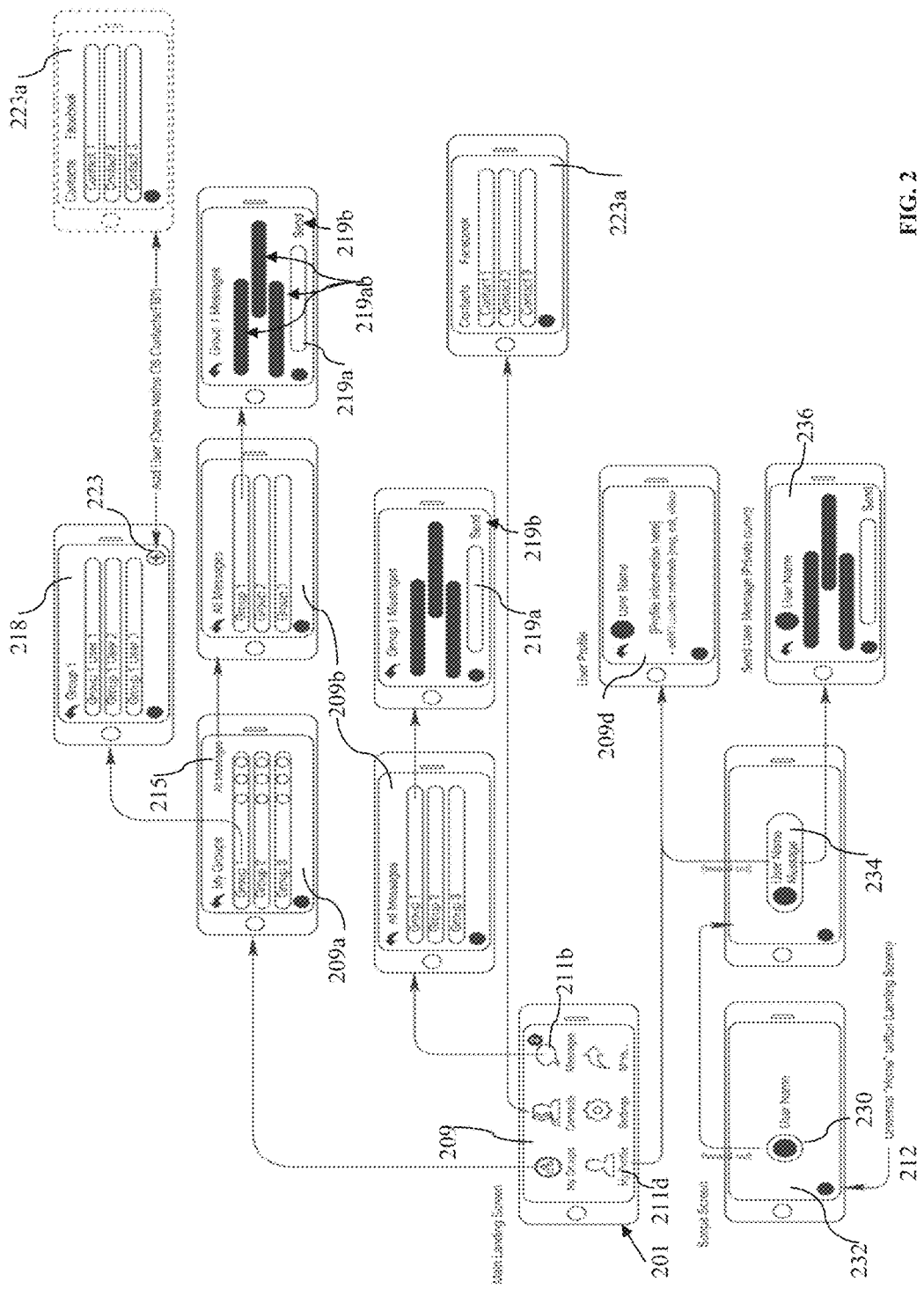
FIG. 2 illustrates a diagrammatic view of an architectural example of the system and process for visually connecting people, as seen on a user's device, according to an embodiment.

FIG. 2 illustrates a diagrammatic view of an architectural example of the system and process for visually connecting people, as seen on a user's device (i.e., user interface), according to an embodiment. As shown, a user may be provided on her mobile device 201 with a main landing screen 209, which may include various application buttons such as "My Groups", "Contacts", "Messages", "My Profile", "Settings" and a "More . . . " button, to reveal additional buttons when activated. Other buttons may be placed on the main landing screen as well, such as "Invites", to show the number of invitations sent or received to join groups.

When the user selects/activates (e.g., by pressing, touching or swiping) the "My Groups" button, a groups' screen 209a will preferably open, on which a list of groups the user has created or is part of will be displayed.

Next, when the user selects a group (e.g., Group 1) from the group list, a screen 218 for that group will preferably open, listing all group members of that group and giving the user several options. One of such options may be to add members 223 to that group, which may open a contacts screen 223a, on which the user may add group members from his mobile device's contacts or from a social media site such as Fecebook™. Similarly, the contacts screen 223a may also be accessed via the "Contacts" button on the main landing screen 209.

As shown, from the groups' screen 209a, the user may select an "All Messages" button 215 to access the groups' messages screen 209b, which may list information such as the number of messages (not shown) exchanged within each group. The groups' messages screen may also be accessed from the main screen 209 by selecting the "Messages" button 211b. From the groups' messages screen 209b, the user may select a group (e.g., Group 1) to view the messages exchanged 219ab within that group, and/or to send messages to the group by typing them into a message box 219a and then selecting a "Send" button 219b.

From the main screen 209, a user may also select the "My Profile" button 211d to view and edit her profile (e.g., name, age, preferences, etc) on a profile screen 209d.

When on the scope screen 232, a user may select a representation of a group member 230 (e.g., an icon) showing on the scope screen, to enlarge that group user's container 234, in order to view additional information about that user and/or to access optional interaction methods with that group member, such as by text messaging 236.

It should be noted that a universal application "Home" button 212 is preferably provided on all screens, other than the main screen, to enable the user to return to the main screen 209 at any time.

Figure 3:
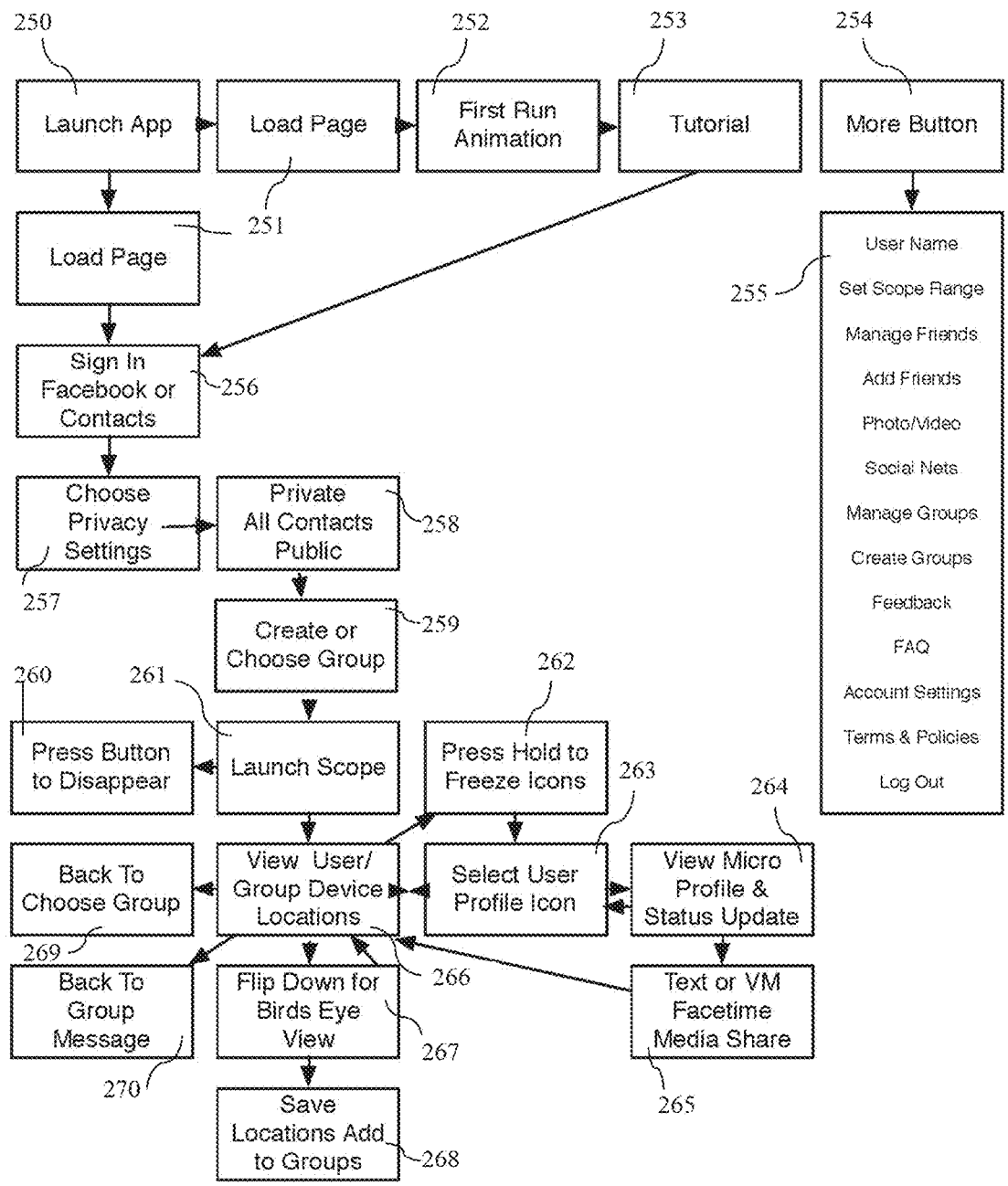
FIG. 3 is a flow chart depicting examples of user steps in a process for visually connecting with people, according to an embodiment.

FIG. 3 is a flow chart depicting examples of user steps in a process for visually connecting with people, according to an embodiment. As shown, a user may start the application by activating a launch button (step 250). Next, after a main landing page/screen of the application loads (step 251), the user may be presented with several options on how to proceed. For example, the user may be offered the option to first view a movie, run an animation (step 252) of the application, or go through a tutorial (step 253), both of which may be designed to educate the user on how the application works, and how to access its various features, such as scope, bird's eye view, friends finder, group video chat, and the other application features described in this disclosure. On the main landing screen, as well as on other application screens, a "More . . . " button may be offered to the user (step 254), which when selected may reveal various buttons such as the ones shown at 255. These buttons' functions are self-explanatory or are described hereinafter when referring to FIGS. 4-31.

Of particular importance may be the "Set Scope Range" button shown at 255. Using this button's function users can set the range (e.g., 0.5, 1, 5, 10, or 50 miles radius) of their accessibility (i.e., accessibility/range to find friends or range of their visibility to others, or both), which may be limited to the close range of an avenue for example, or broadened to a range of miles. A numerical indicator under each user icon visible in scope may indicate the approximate distance away. Users may also get an alert if they are within range of certain blocked or listed individuals.

Similarly, a bird's eye range may be set.

Also, the shown "Social Nets" button may be offered to allow the user to, for example, view two social network sites on a split screen and/or to post to such sites.

After the user lands on the main screen, the user may be asked to log in (Step 256) using the login credentials of one of user's social media sites (e.g., Facebook™), to log in by email, or to create login credentials in the application itself. Next, the user may be offered to add contacts (e.g., friends, family members, professional colleagues, etc) to the application, from user's social media sites (e.g., friends from Facebook™), or from the contacts stored on the user's mobile device, for example (step 256).

Next, the user may be presented with the option to set user's privacy preferences (step 257). The user may, for example, choose to be discoverable/visible by all application users (i.e., "Public" option in step 258), only by user's contacts (i.e., "All Contacts" option in step 258), or only by members of private groups (i.e., "Private" option in step 258), user created or is part of. Thus, users have complete control over who can view their location. Users can manage their visibility, limiting it to private invitation-only groups, Facebook™ friends for example, and/or all application users, which can be filtered by, for example, Facebook™ interests or specific event invitations. Or, users can disappear from sight at the touch of a button (step 260).

Next, the user may create groups or choose groups (step 259) to interact with as it will be described in more details hereinafter, when referring to FIGS. 4-32.

Next, the user may launch the scope (step 261), view group members' location in scope (step 266) and interact with groups and groups' members, such as described later when referring to FIGS. 22-32. By turning on the scope, the user can find her friends without saying a word. The user may then select (step 263) a group member's profile icon appearing in scope, to view (step 264) that group member's profile (e.g., name, age, etc) and/or to start (step 265) a text, audio, or video chat, or to exchange media (e.g., pictures) with that group member.

Application users may privately share photos, videos and/or comments with selected groups, person-to-person within a group, or across social networks of their choice. In addition to sharing on social media servers, users can choose to share content peer-to-peer via, for example Bluetooth LE. As an example, the sharing may be similar to SnapChat™ but only the sender and receiver keep photo/video on their device. In this mode, no content is stored on servers.

Users using the application may also be able to post status updates (step 264) to multiple social networks directly from the application. The application may be configured to provide a split screen, horizontal layout, for the users to view two social sites of their choice simultaneously.

When in scope mode (step 266), the user of the application may freeze the screen (step 262) by pressing a "Hold" or "Pause" button. Freezing the screen may be useful so user can easily touch a group member's icon appearing in scope, to initiate contact without chasing them on screen.

From the scope screen, the user may navigate to group message screen (step 270), on which the user can view that group's messages and/or send messages to that group. The user may also choose to navigate to a "Choose Group" screen (step 269) to select a different group or to add a group to see in scope and interact with.

In scope, users can easily scan (e.g., left or right) and view the location of other application groups/users, in real time and 3D space on the screen of their handheld device via augmented reality. A compass may live in the top right corner of the screen to indicate all group members' location relative to each other and/or the direction the camera points to (e.g., north, east, etc.).

From scope mode, or at any time after the application is launched, a user may be allowed to flip/tilt down (step 267) her mobile device for bird's eye view, and optionally, save locations (step 268) showing up on the displayed map. For example, the user may want to save her location when parking her car, when next to a tent or a preferred location, for easy finding later.

In scope mode, bird's eye mode, or at any time after launching the application, the user may be permitted to press a button to disappear (step 260), such as that she is not discoverable/visible by the other application users.

The user may also add groups to create, be part of or interact with, as described in more details hereinafter when referring to FIGS. 4-32. The user may invite/create and manage various private groups or individuals to view in scope mode. Invitation recipients may get a text and/or appropriate welcoming email message. Creating a group is like inviting friends to your party and makes you the host. You control who is in each group. It is like hitting a reset for your Facebook™ friends, pairing them down into manageable groups.

Group Admin can create an on-screen ticker scroll message specific to each group. Thus, a festival command center for example would preferably be able to override this message on all devices in the event of an emergency for example.

Figure 4:
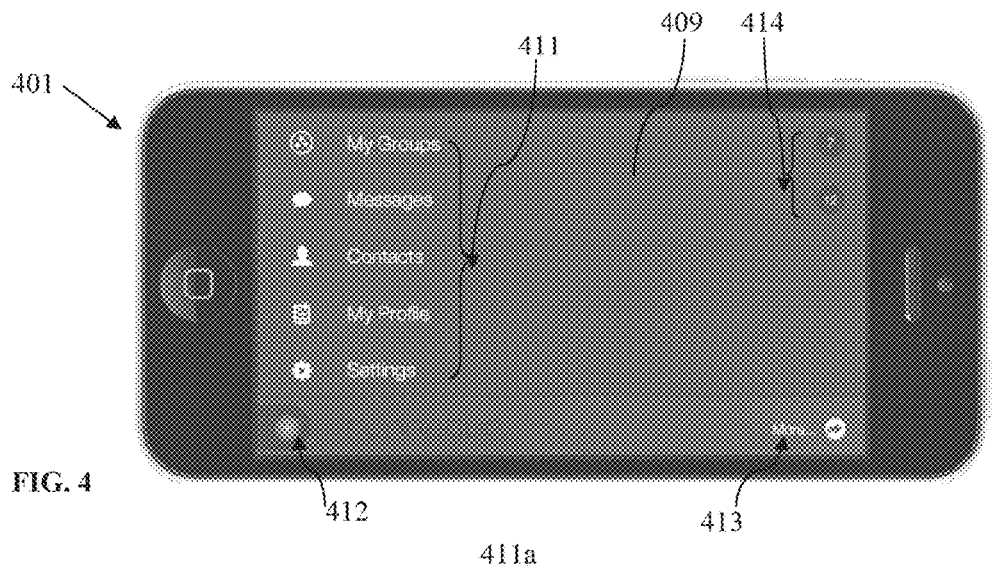
FIGS. 4-31 illustrate a collection of examples of user actions that can be performed on a user's mobile apparatus when using the system and method for visually connecting people, according to several embodiments.

FIGS. 4-31 illustrate a collection of examples of user actions that can be performed on a user's mobile apparatus when using the system and method for visually connecting people, according to several embodiments. FIG. 4 shows a mobile device 401 displaying the application's main menu screen 409. As shown, several main buttons 411 may be provide, for the user to activate by tapping, swiping, touching, pressing or the like. Additional application buttons, such as "Log Out", "FAQ" or the like may be revealed by activating the "More . . . " button 413. As shown, the main menu screen 409 may also display additional data 414, such as how many groups were created by the user and/or the user is part of, how many unread messages were received, and so on. The main menu screen 409, as well as several other application screens described below, may also display a main menu or home button 412, which the user may activate to conveniently return to the main menu screen, when so desired.

Figure 5:
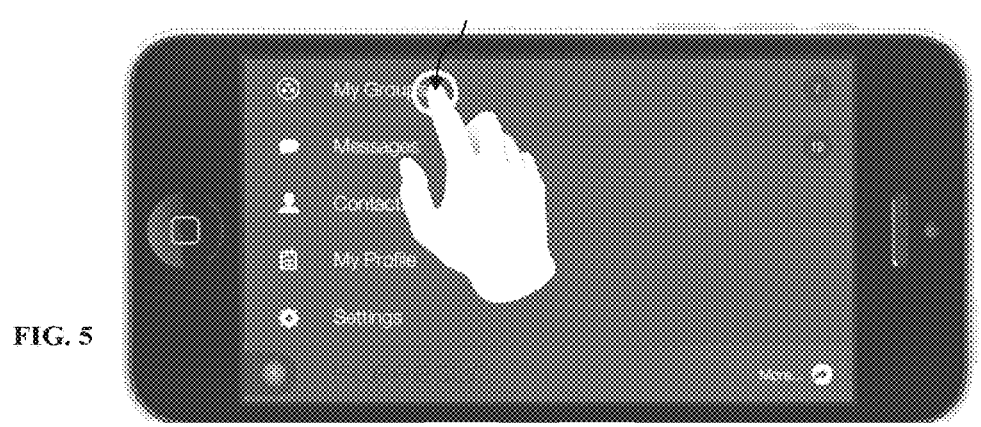
Figure 6:
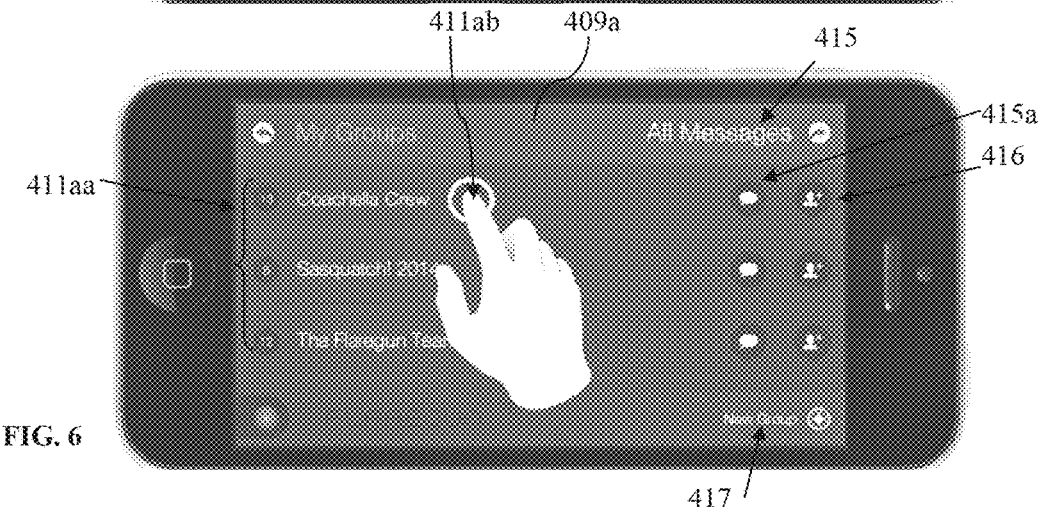
Figure 7:
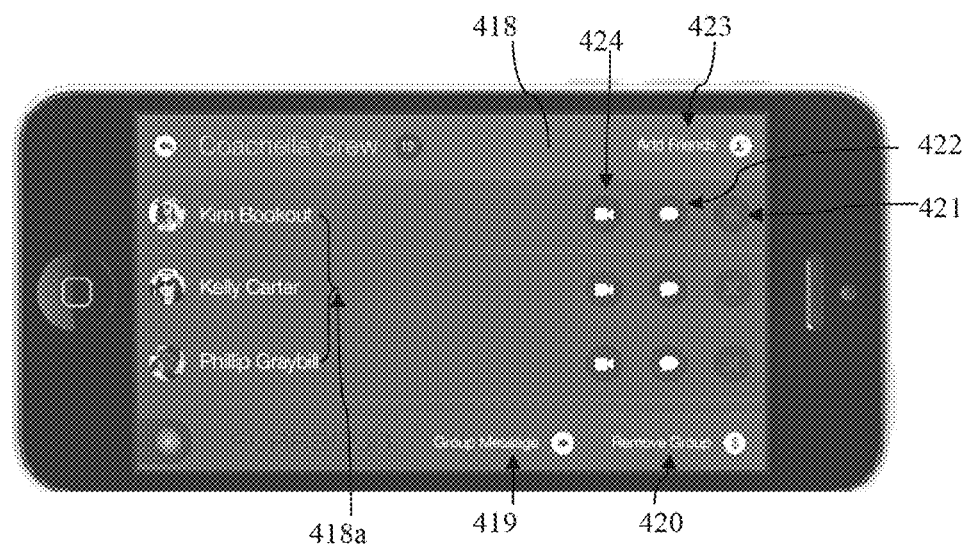
Figure 8:
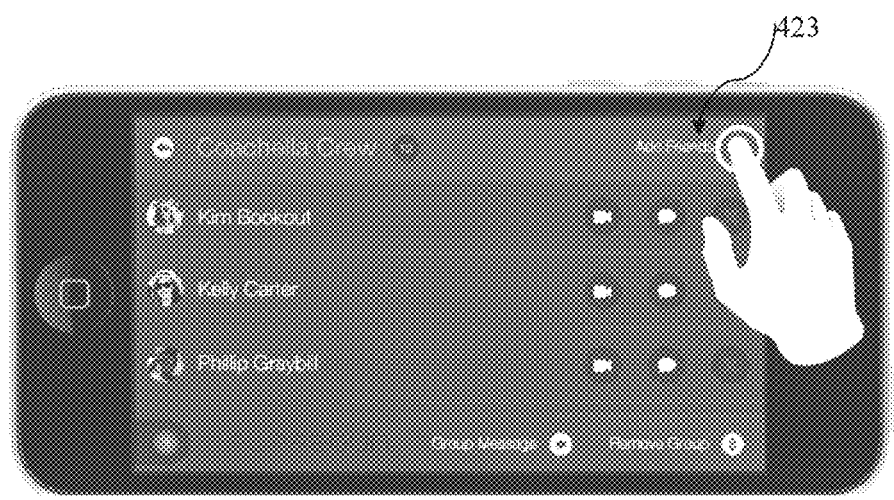

Referring now to FIGS. 5-7, a user may select "My Groups" 411a to view, on a group list screen 409a, a list 411aa of all groups the user has created or is part of. As shown, the list 411aa may include the names of the groups and the number of members in each group. On the group list screen 409a, the user may be provided with the several options, such as to view all messages 415 sent and/or received from all groups, send a message 415a to a particular group from the list, add additional members 416 to a particular group or create a new group 417. Additionally, the user may select a group 411ab (FIG. 6) to view that group's screen 418 (FIG. 7).

When on a group's screen 418, a group member list 418a may be displayed. The group member list 418a may include the names of the group members and a photograph of each user. As indicated earlier, when a user logs in the application using her Facebook™ credentials, the user's name and/or photograph may be retrieved from her Facebook™ page. When on a group's screen 418, a user may add friends 423 to the group, start a video chat 424 with a group member, send a message 422 to a group member, delete a member 421 from the group (if the user is the one who created the group), view or send group messages 419 or remove this group 420 from his group list.

Figure 9:
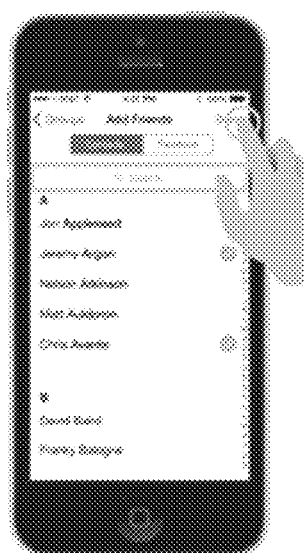

When the user selects to add friends 423 (FIG. 8), the application may be configured to open a screen (FIG. 9) on which the user may select friends to add from his mobile device's contact list or the user may be given the option to select friends to add from his Facebook™ list of friends, or the like, as shown in FIG. 9. Similarly, a user may be allowed to add contacts to her application contacts ("Contacts" in FIG. 4).

Figure 10:
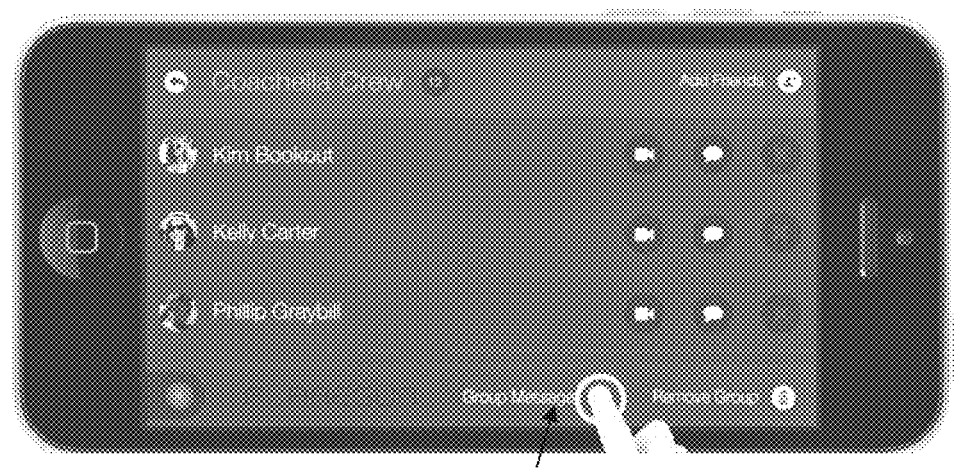
Figure 11:
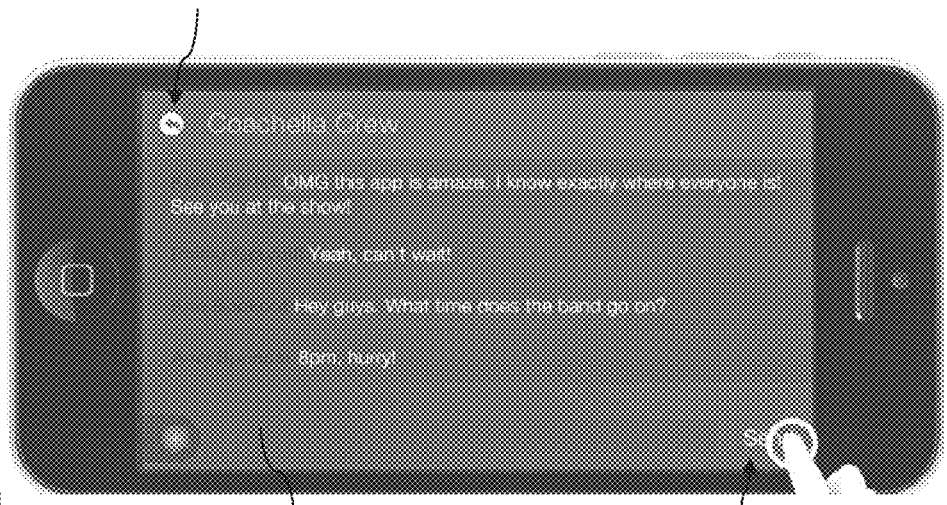

Referring now to FIGS. 10-11, when the user selects "Group Messages" 419 (FIG. 10), the application may be configured to open up that group's messages screen (FIG. 11) displaying the messages exchanged by the group members. On the same screen, the user may tap an input field 419a, which causes the Apple™ OS keyboard to reveal so that the user can type his message in the text box 419a. Next, the user may hit a "Send" button 419b to post the message to the entire group. Next, the user may swipe or tap a "Back" button 419c, to return to Group screen (FIG. 10).

Figure 12:
Figure 13:
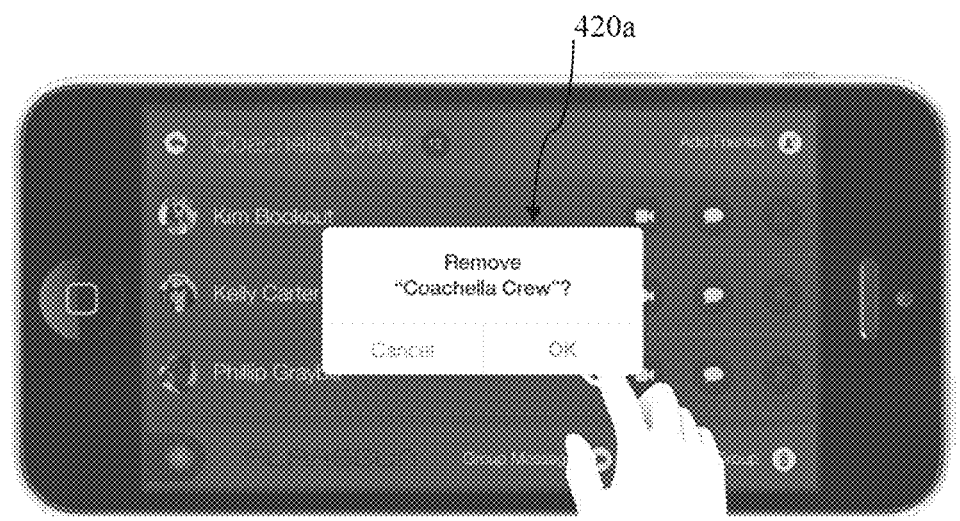
Figure 14:
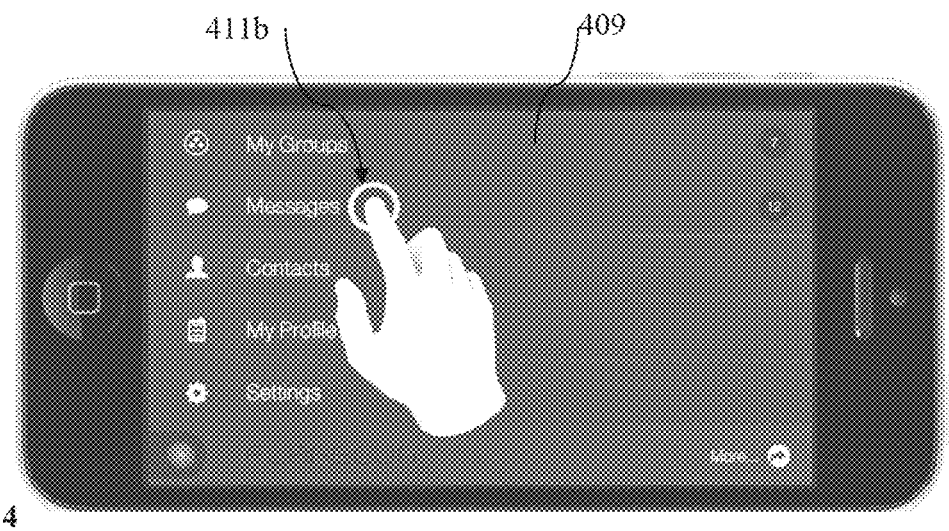

Referring now to FIGS. 12-13, it is shown that the user may select "Remove Group" 420 to delete the current group. Typically, a user may delete only the groups she created or if she is an administrator/operator of the application. Otherwise, by deleting a group, the user would be leaving the group and unable to view the other group members. An alert popup 420a (FIG. 13), asking for confirmation, may also be displayed to the user.

Figure 15:
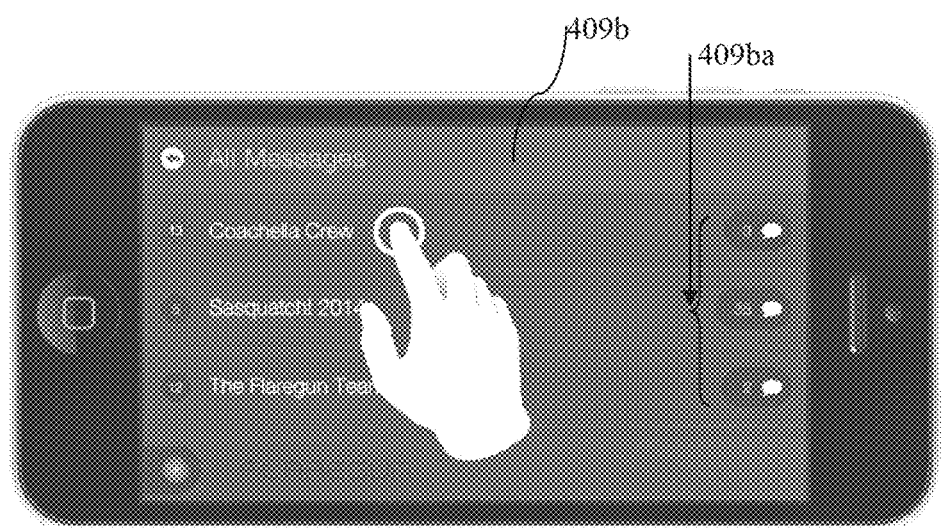
Figure 16:
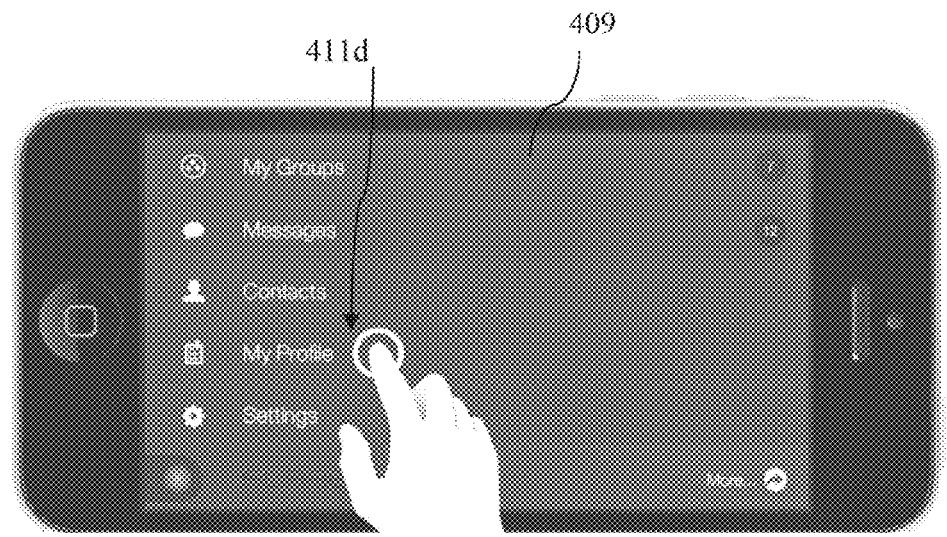
Figure 17:
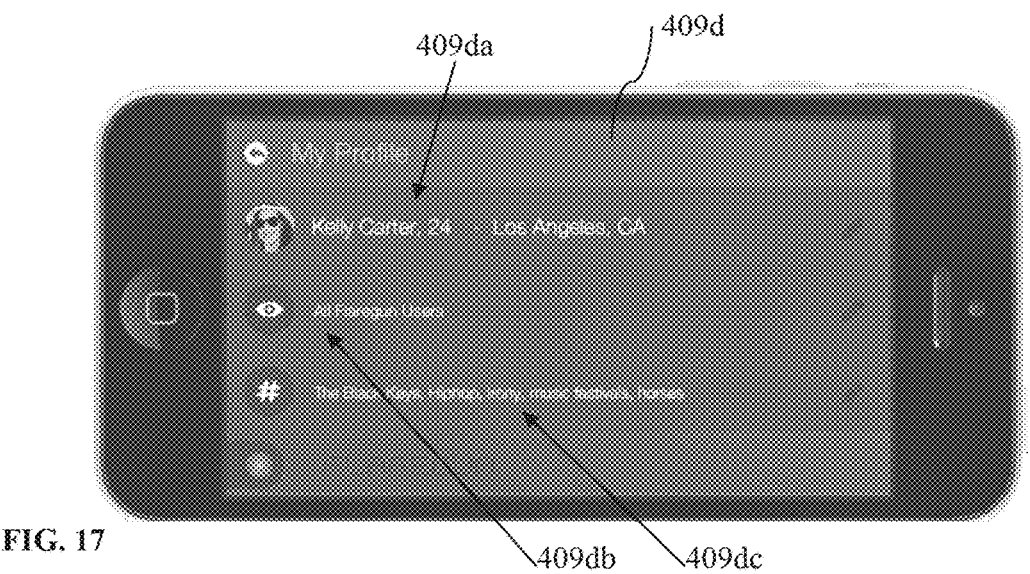
Figure 18:
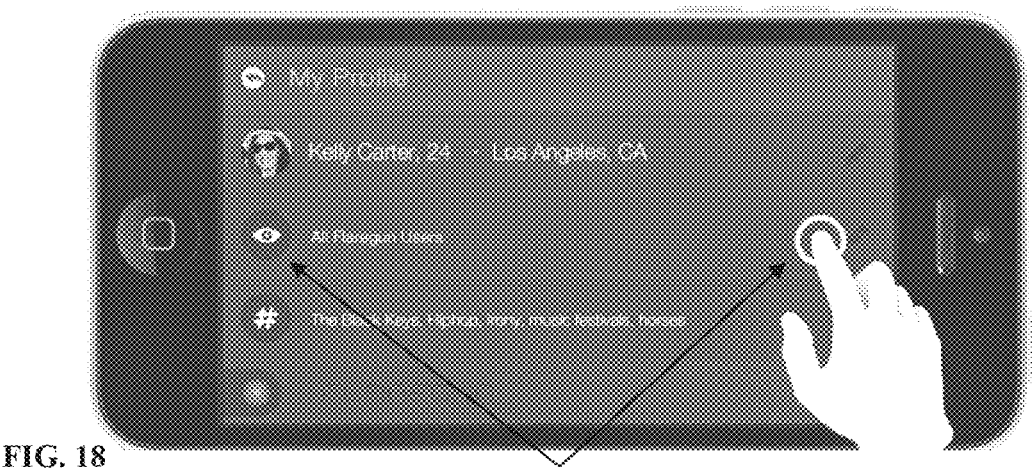

From the main menu screen 409 (FIG. 14), the user may select "Messages" 411b to open an "All Messages" screen 409b (FIG. 15). On that screen, the user may be shown the total number of messages 409ba associated with each group. The user may also select a group to view group's messages and/or send messages to that group as described earlier when referring to FIG. 11.

Figure 19:
Figure 20:
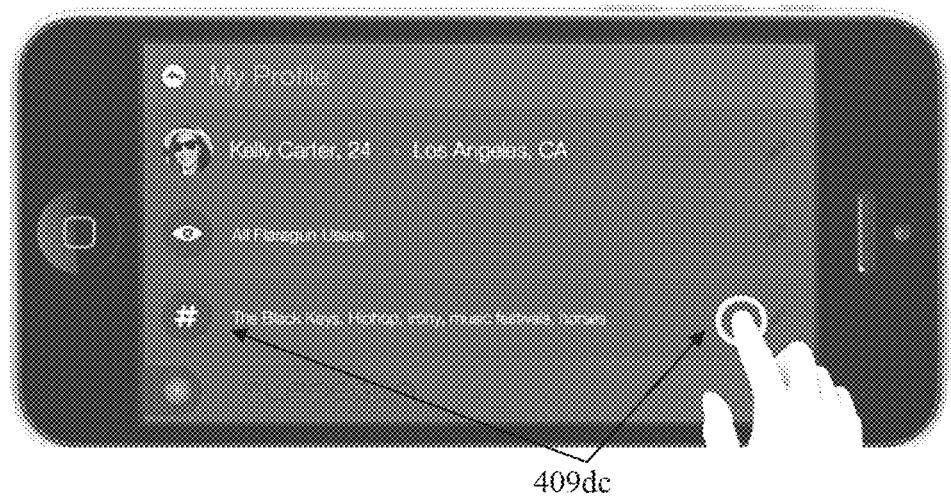
Figure 21:

Referring now to FIGS. 16-21, it is shown that on the main menu screen 409, the user may select "My Profile" 411d, to view and/or edit her information on a profile screen 409d. The main profile data 409da, as shown, may include a user's photograph, name, age and/or data about her location. The user may, for example, tap the mail profile data 409da to view and edit the respective profile information. From the profile screen 409d (FIG. 17), for example, the user may also be provided with the option to access other profile settings such as her privacy settings 409db and preferences 409dc. The user may for example tap to view and/or edit privacy settings (see 409db in FIG. 18; see also FIG. 19). As shown in FIG. 19, privacy settings options may include "Private Groups," "All Contacts," and "All Application/Flaregun Users". The user may also tap to view and edit preferences 409dc (FIGS. 20-21). User may type keywords or phrases into the input field to add personal preferences or may delete existing preferences. Keywords and phrases should typically be separated by a comma.

Figure 22:
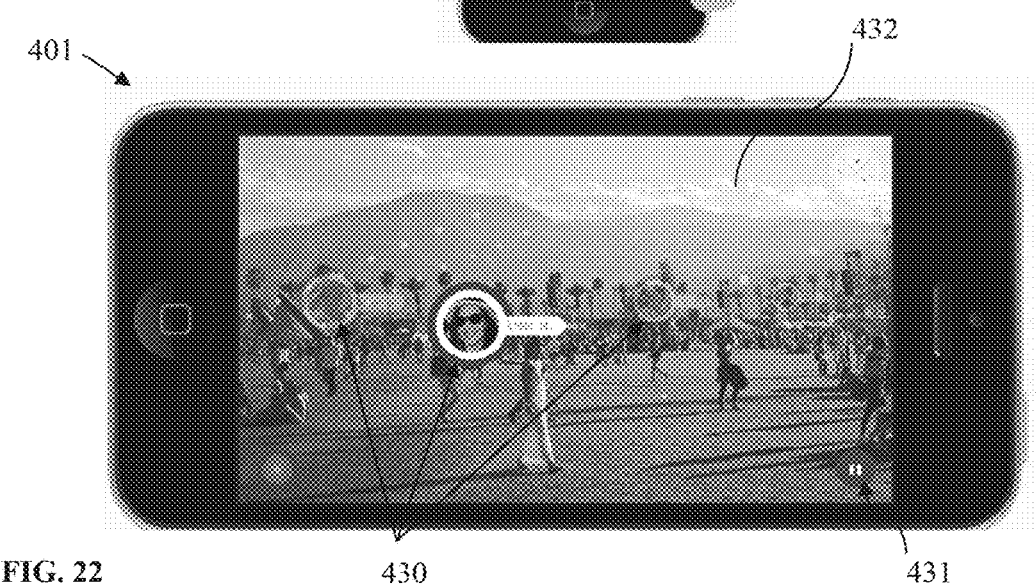

FIG. 22 shows the application in scope view/mode on the user's mobile device 401. After launching the application, the scope may be activated in various ways, such as by tapping a "Finder" button (see FIG. 1), taking the mobile device's camera out of the bird's eye view, or by pointing the camera at the surroundings as shown in FIG. 22. A purpose of the scope mode may be to visually connect with friends, family members, professional colleagues, work colleagues, and the like, who typically will be members of the application groups created by the user, or groups the user is part of (see 411aa in FIG. 6 for example). These real time visual connection features provide not only for, for example, a better social media experience, but provides various other benefits as well, such as meeting, locating, and/or finding a person (e.g., friend or family member), and/or their mobile devices, in large spaces (e.g., a mall, college campus, show venues, ski resorts, airports, etc.), and/or in large crowds, such as at a concert (see FIG. 32).

The application may be configured to allow the user to scan the crowd or the large space, and the augmented reality module may overlay a representation 430/FIG. 22 (e.g., icon or photograph, plus name, location and/or distance) of each group member over a point in the scope image 432 having the position coordinates (e.g., latitude and longitude) corresponding with the position coordinates of the group member's mobile device. Again, as described earlier when referring to FIG. 1, the determination of the location of a group member in the scope image 432 may be facilitated by the mobile device's 401 (FIG. 22) gyroscope and GPS module (see FIG. 1) which may provide the data necessary to determine what is the user mobile device's 401 camera looking at (i.e., by knowing the orientation and location/position of the user mobile device 401 and thus its camera). In addition, as mentioned earlier, the group members' 430 position may be known from the GPS coordinates supplied by group members' mobile devices to the application server 103 (FIG. 1).

Thus, for example, the user holding her mobile device 401 in her hand, in scope view, may choose to walk toward a particular group member appearing in scope in order to meet that group member in person. Or, as another example, within the application, the user could start a social media interaction (e.g., text messages, video or audio chat, etc.) with one or more group members (including simultaneously) appearing in scope.

As suggested in FIG. 22, some of the user representations 430 may be faded out and/or a size scaling effect may be used on them to correlate with the group member's distance. The group member that is the furthest away will preferably have the smallest (and/or most faded) representation (e.g., icon) and the closest will have the largest (and/or less faded), with preferably at least three size points in between, to indicate depth of field. Other similar graphical effects may also be used.

Figure 23:
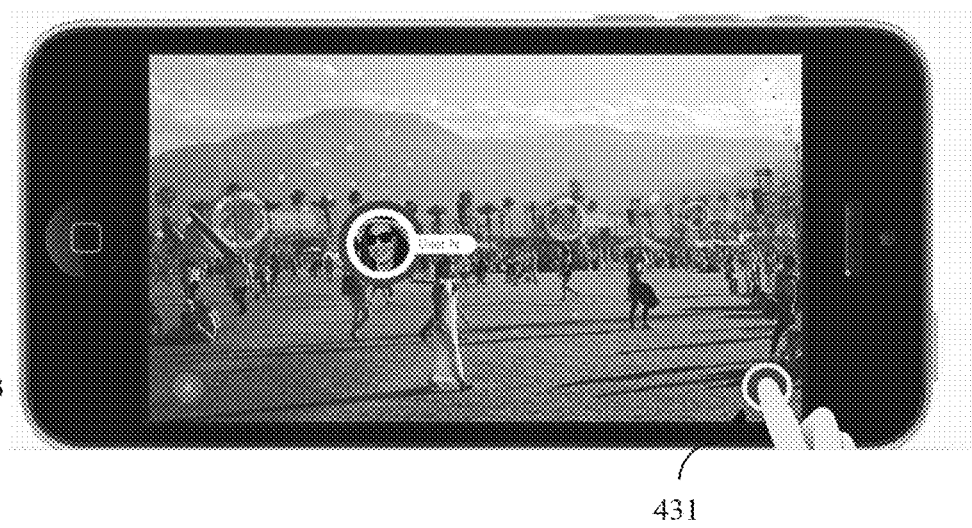
Figure 24:
Figure 25:
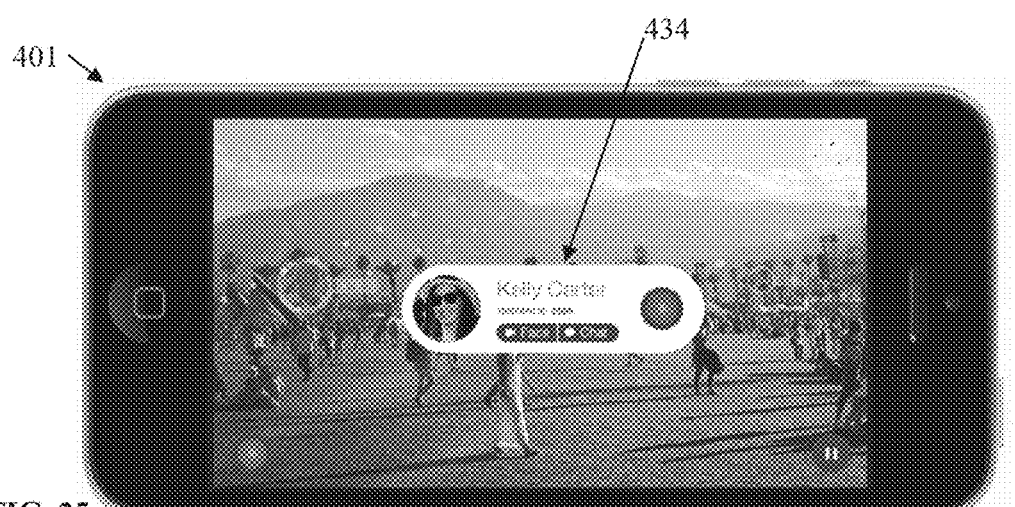
Figure 26:
Figure 27:
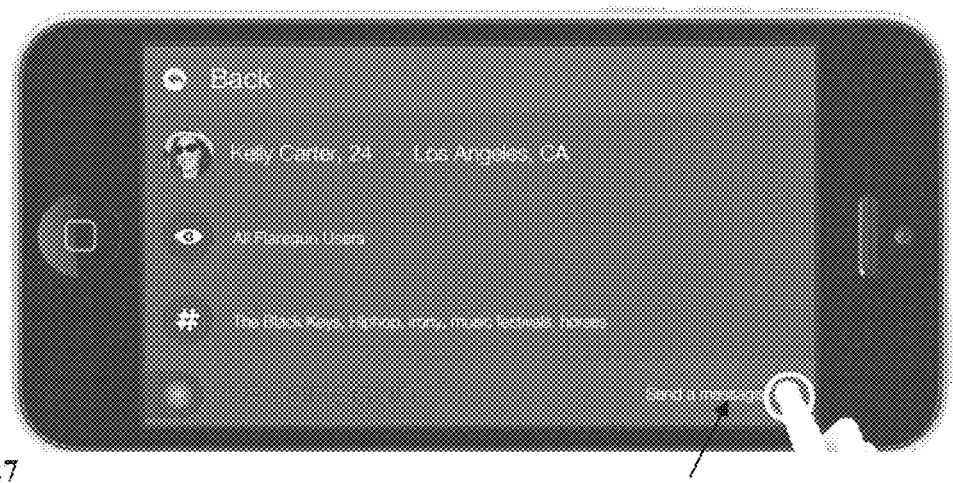
Figure 28:
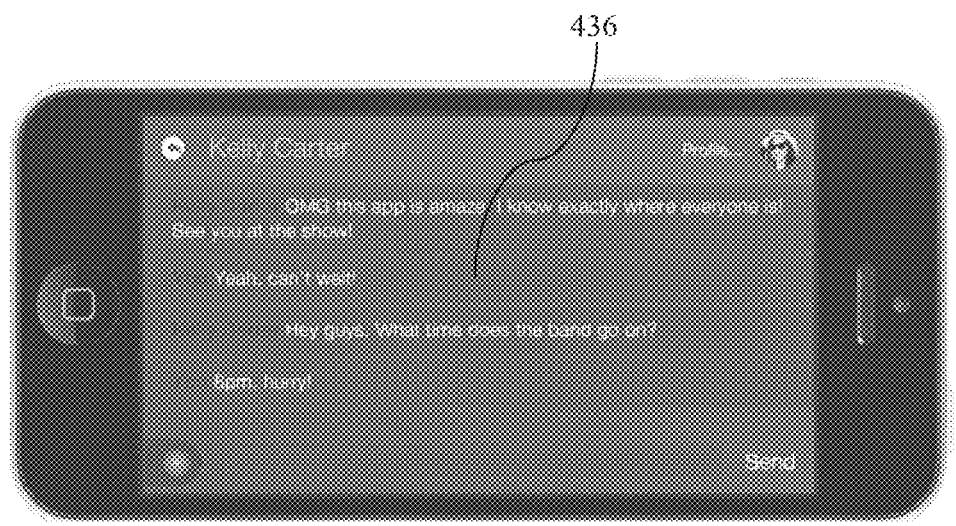

As shown in FIG. 22, when in scope view, a user may tap a pause button 431 to freeze the screen (FIG. 23). Freezing the screen may be useful such as when the user may want to start an interaction with a group member showing up in scope as the freezing may stop any jumping that may come from the user's camera movement. For example, tapping a group member's icon 433 (see FIG. 24) may cause the expansion of that group member's container 434 (FIG. 25), revealing several options, such as to send messages, start a video chat, or the like. After the container 434 is expanding, tapping for example a "Face" button (see FIG. 25) may cause to connect the user of the mobile device 401 with the group member from the container 434 via a video chat application such as Apple™ Facetime™. As another example, tapping a "Chat" button in the container 434 (see FIG. 25) may cause a connection via text message. Further, tapping anywhere else (see FIG. 26) on the expanded container 434 may take the user to that group member's profile, to view more information about that user, such as her preferences, and see additional options (see FIG. 27). Selecting "Send a message" 435 on that user's profile screen may open a chat dialog screen 436 for the user and that group member (peer-to-peer messaging; see FIG. 28).

It should be understood that, for example, the representations 430 (FIG. 22) of the group members appearing in scope may include a real-time video, so real time video chat may be held simultaneously in scope view with, for example, all or some of the group members appearing in scope. Similarly, same real-time video chat may be held in bird's eye view as well. These inventive aspects may even further augment the benefits of the application described herein.

A "Settings" button may also be provided on the main menu screen (see FIG. 4 for example). By tapping "Settings" a user may change application settings such as the range of scope view, general account data or privacy settings.

Figure 29:
Figure 30:
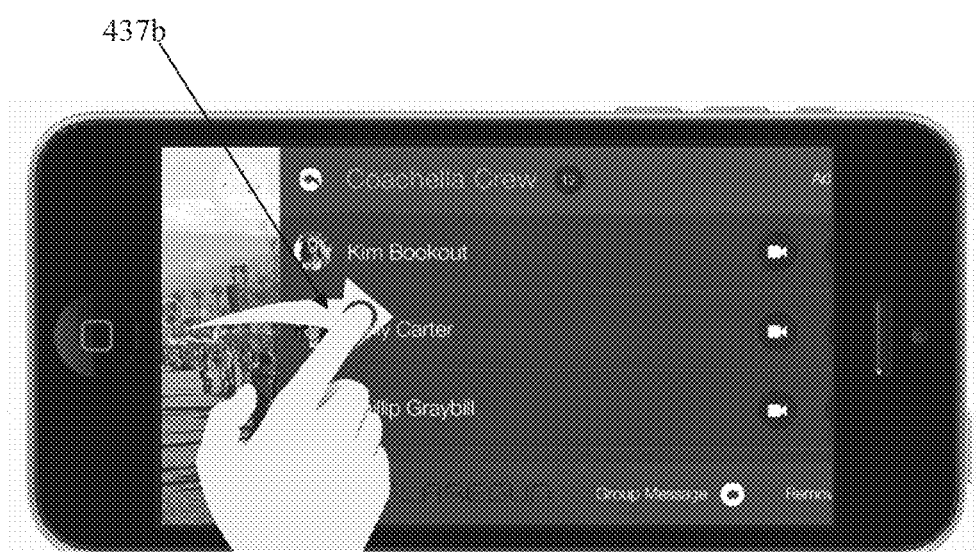
Figure 31:

Referring now to FIGS. 29-31, when in scope mode, the user may be provided with the option to swipe left 437a (FIG. 29) to reveal the current Group screen (as seen in FIG. 7) or to swipe right 437b (FIG. 30) to return to the Scope screen. Again, as mentioned earlier in this description, in scope view as well, selecting the application logo/button 412 (FIG. 31) will take the user to the Main Menu (as seen in FIG. 4). This button lives on most of the application's screens.

FIG. 32 illustrates an example of use of an apparatus and method for visually connecting people, according to an embodiment. As shown, a user may point her mobile device 401 in scope view to a large crowd (e.g., at a concert) to locate her friends and/or start one or more of the interactions described herein with one or more of the friends appearing in scope.

Figure 33A:
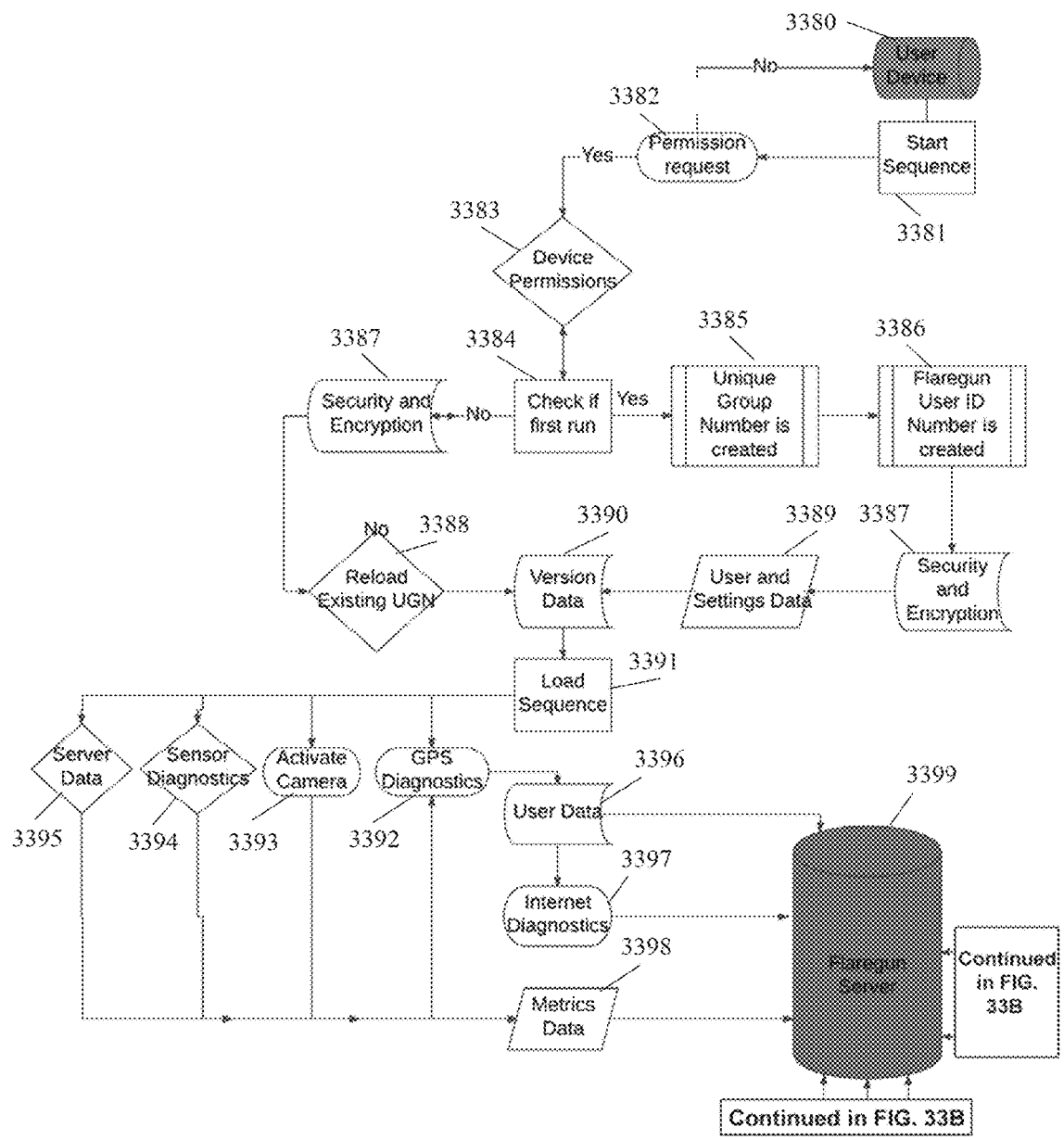
FIGS. 33A-33B illustrate a flow chart depicting steps in another example of a process for visually connecting with people, according to an aspect.
Figure 33B:
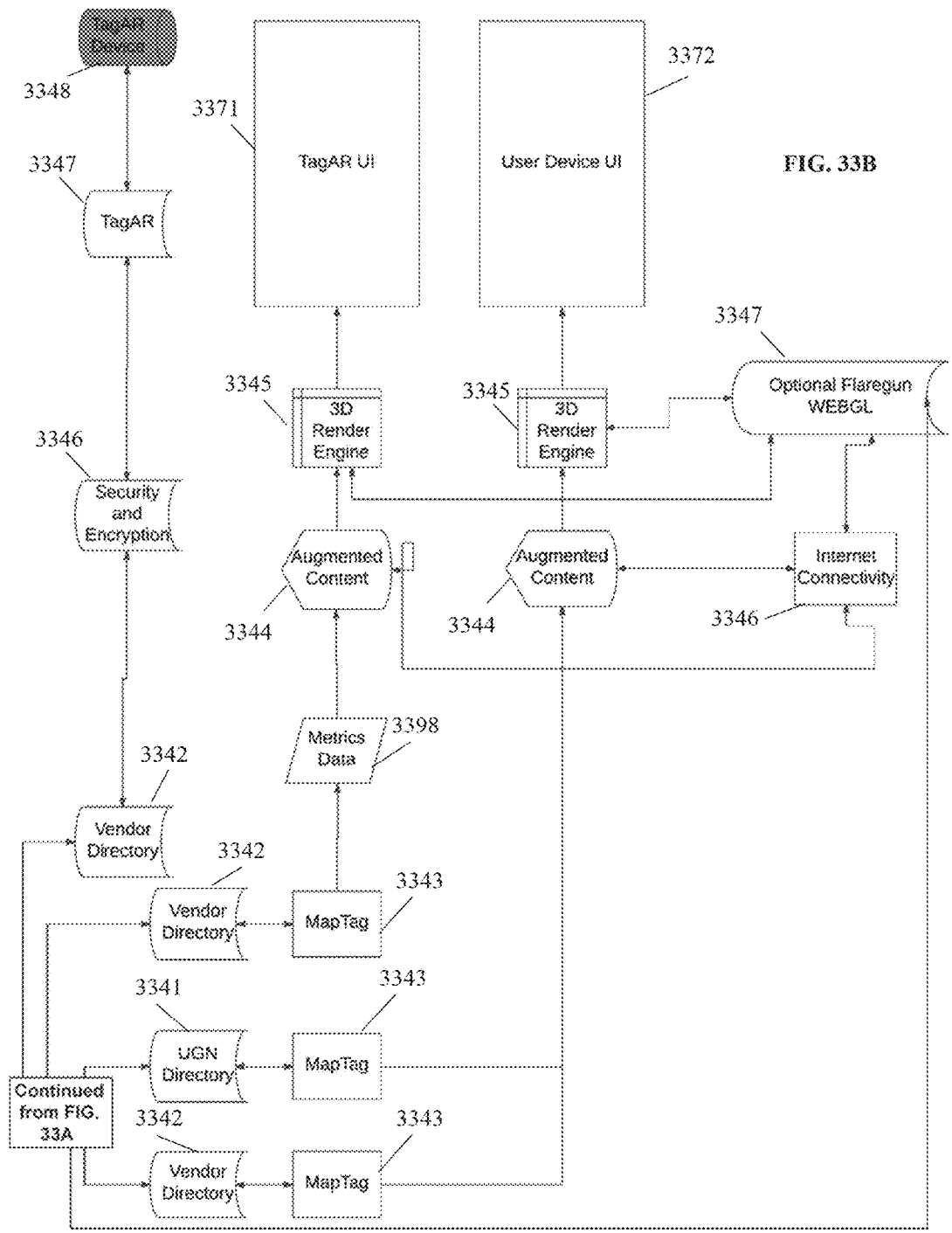

FIGS. 33A-33B illustrate a flow chart depicting steps in another example of a process for visually connecting with people, according to an aspect. The system may be implemented by an application on any mobile device having GPS or other similar sensor features, internet access, and a front-facing camera (step 3380). The application may also run a process for GPS mapping and use of geolocation algorithms ("MapTag"). For MapTag, a 3D render engine may be implemented. The mobile device (as described when referring to FIG. 1) may be used to launch the application for visually connecting with people. Next, the application may run a start sequence (step 3381). The start sequence may request required device permissions (step 3382). If the permissions are not authorized ("No") the application may return to the application initialization (step 3380). If the permissions are authorized by the user ("Yes"), the application may access the mobile device's location services and camera functions, or any other necessary functions (step 3383). Next, the application may check if it is a first run, to determine whether the application software is being run for the first time, or if data for the application has previously been stored (step 3384). If no, the application may load data from the server (which may be referred to as a "Flaregun server"), such as security and encryption data (step 3387) and reload an existing unique group number ("UGN") (step 3388). Next, the application may load application version data and information (step 3390) from the server.

If yes, the application may procedurally create the following exemplary data: a unique group number ("UGN") (step 3385), and a unique user ID ("unique ID," "unique Flaregun User ID," of "Flaregun user number") (step 3386). The unique user ID and the UGN may be created from a set of random numbers and may be checked for duplicates. A directory with the UGN name may be created, and the device may be allowed access to that UGN. UGNs may be assigned programmatically when the user first begins to use the application.

Next, the application may store data on the user's device (step 3389), such as the user ID, the UGN, the user's phone number, GPS data, and the time of day at runtime. Next, the application may load data from the server, such as security and encryption data (step 3387) and application version data and information (step 3390).

Next, the application may proceed to a load sequence (step 3391). The load sequence (step 3391) may enable the transfer of data between a device running the application software (which may be referred to as a "Flaregun device") and the server, and may initiate an update loop. The load sequence may load the following data from the server: application ("Flaregun") version information, application security and encryption data, metrics profile, and past user data and settings. The application version information may enable a mode of data access that may be tied to a specific or particular version of application software, and may be used for customizing the application software based on factors such as geographic locations, and other methods of changing user experience, using version information to control content of the application. The metrics profile may be stored as a data file, and may direct the software to begin collecting specific metrics. Metrics variables may be used for the collection of any software usage information, device behavior, location data, and other sensor data. Past user data may include past UGNs and vendor data, and settings information may include blocked user lists, and other user interface data such as user preferences.

The load sequence (step 3391) may load GPS diagnostics and start the device's GPS functions (step 3392), activate the device camera (step 3393), and load sensor diagnostics (step 3394) and server data (step 3395).

When starting the device's GPS functions (step 3392), the application may enable the device's location services, and check if the GPS is current. If yes, the application may begin sending GPS data to the server and update the current group number with the location of the user. If GPS functions are not current, the application may send a notification to the user to enable location services on the device, or may correct the problem automatically and next return to the load sequence. The camera activate step (step 3393) may send the camera feed to the background processes of the application, and enable an augmented content layer onto the camera feed. The load sequence may also scan the current application vendor directories and the user data files inside the UGN directory for data (to be further discussed when referring to steps 3341 and 3342). If the GPS telemetry is set to yes, the application may load the user's GPS variables into the application's MapTag functions. MapTag may then be used to translate GPS into 3D coordinates, and locate the user inside of the Flaregun ecosystem. Next, translation from GPS to Cartesian coordinates may occur, and this process may include but not be limited to Ellipsoidal and Spherical conversions of World Geodetic System 1984 (WGS84). The user's GPS data may be sent to the server, and update intervals may be dynamically optimized based on the device performance. The GPS data may be converted to degrees, minutes, and seconds for display and for data logging purposes. The metrics variables may also be updated with the user's GPS data.

Loading of server data (step 3395) may include scanning for user data files inside of the UGN directory, and loading each found user's data file from any user in the UGN directory, and scanning current application vendor directories. The step may also include loading default and custom icons for communication, text, video, audio, and uploading photos and sharing data between users inside the UGN. This may be used for adding communication functionality to the Flaregun application ecosystem. Metrics data may also be loaded. This step may include loading the list of applicable metrics variables which are to be enabled when the user is accessing the application. Event profiles, such as a list of timed events which may affect augmented content, may also be loaded. Geolocation profiles may also be loaded, which may include a list of directions for functionality based on specific geolocations, and may include information from development kit ("dev kit") data files from any user in the UGN directory. This may also allow the application to display augmented data on the device screen, based on each data file. The augmented data may include visible icons representing data, data points that are geo-located within the Flaregun application ecosystem, friend locations from users in a specific UGN, and vendor content locations from the applicable vendor directory.

Dev kits may be standalone client-side software, and may be run as a standalone application to provide a means of controlling augmented data content to be used with the application for visually connecting with people. The dev kits may create data files on the server based on the user interface design of each dev kit, and there may be an unlimited number of dev kits. Visibility of dev kit content may be controlled by the application for geolocation ("MapTag"), and may be limited or unlimited to all users in all UGNs.

Next, the application may send user data and information to the server (step 3396). The user data may include GPS and other positioning information, and updates to metrics variables based on the programs being used by the device. Metrics data may be a placeholder variable for any device-related data that could be sent through the Flaregun system, and may be aggregated for improvements to the software, and for providing metrics that may be of use to clients. This data may include device location over time, overheating and other performance issues, proximity to sensors which may work with the software, and any other data being collected by the Flaregun platform and sent to the server. Such metrics data (step 3398) and any other user data (step 3396) may both be sent to the server (step 3399).

The application may also check for internet connectivity and check internet diagnostics (step 3346) and if yes, the application may communicate with the server (step 3399) to send or update the user data file. The update rate may be based on optimum device speed, and the network performance threshold may be enabled. Next, metrics variables and data may be communicated to (step 3398) and stored on the server (step 3399). Without internet access (checked for in step 3346), the application may send a notification to the user, and may load offline content. Offline content may include past experience data, tags, location information, and any data that was previously downloaded as offline content. Offline content may also include data stored by the user that does not require an internet connection, such as the user's current location for returning to a location, and sharing locations with others through SMS.

Next, the application may create and store data from the server (as shown by step 3399 of FIG. 33A) into a UGN directory (step 3341). UGN directories may contain the group of users which will remain visible to each other. Multiple UGNs may be combined into the same user experience, and UGNs may be sharable with other users who wish to join that particular group and become visible to other users of that same UGN directory. Users may also have the ability to share their UGN with others through text messaging, or any other means.

The application may also create and store data from the server into a vendor directory (step 3342). Vendor directories may correspond to a dev kit, and the data files in a vendor directory may be visible to all or a select number of users in a single UGN, or a plurality of UGNs, such that a user may be both visible to other users of a UGN, and view the other users within that UGN, as well as being able to view members of the other UGNs. The UGN numbers may be used repeatedly, may be stored in the user data directories of the application, and may provide a way to distribute a group identity to the application user experience through text, email, voice call, and so on, such that anyone having the UGN may then be visible to the group, regardless of any other social network connectivity. Vendor directories may be used to send data from a dev kit to all or some of the users in a Flaregun application ecosystem. Vendor directories may be used to add content to the ecosystem without the need for updating the software.

The vendor directories (step 3342) may process security and encryption data (step 3346) for processing graphical representations of augmented content data ("tags"). The data for tags may be referred to as "TagAR" (step 3347) and may be stored on the hard disk of the user's device (step 3348) (to be further discussed when referring to FIG. 50).

The vendor directories (step 3342) may also next communicate with another process for geolocation. Again, the application may also run a process for GPS mapping and use of geolocation algorithms ("MapTag") (step 3343) (to be further discussed when referring to FIG. 49). For MapTag, a 3D render engine may be implemented (step 3345). The application may also make use of graphical representations of augmented content data (which may be referred to as "tags"). An advantage may be that less network usage may be needed and the speed of the device may be improved, and when user movement is detected, the GPS rate may be automatically reset to top speed to maintain best possible performance across the network.

The MapTag (step 3343) may process metrics data (step 3398) and next create augmented content for the application display (step 3344). The augmented content may be graphic or audio representations of data from the server, and may include but not be limited to 3D models, 2D billboarded images, text, and procedurally created sounds and graphics. The data represented by the augmented content may include friend locations and information about all users inside a UGN, and allow the ability to hide or block users, and information about additional UGNs, and allow the ability to search for nearby UGNs and allow the user to add the other UGNs. The data may also include vendor locations, and may display all data files inside a vendor directory, and may dynamically update data from a dev kit. The augmented content may display content preloaded into the Flaregun application on a device based on data from the vendor directory data files. The data files may also be used to create procedural content. Such procedural content may be generated by using only the data from the data files and no preloaded or downloaded graphics, which may reduce the need for downloaded content and thus reduce network usage. Other data represented by the augmented content may include any content already existing on the device which can be manipulated in the render of the application display, such as photos, videos, and audio recordings.

The augmented content may also include display content based on an outside dev kit accessed by the application. Multiple dev kits may be used to implemented augmented content into the application. Dev kit content may be downloaded from the Flaregun servers at any time, and may be used to implement real time and/or scheduled changes to the Flaregun application environment without the need for updating the software. The dev kit may, again, be used as standalone client-side software, may be used as a web-based control panel, or as a sensor-based network. The dev kit may create data files on the server based on the client side user interfaces. The visibility of dev kit content may be limited or unlimited to all users in all UGNs.

Next, the 3D render engine may be implemented by the application (step 3345). The 3D render engine may update the user position data, such as GPS and other positions, and orientation data, as well as any available visual and image recognition based location data from the device running the application. The 3D render engine may determine the best accuracy of the device and may procedurally adapt GPS to safe speeds, which may allow for future improvement of the device to gain performance while running the application. The 3D render engine may also determine the battery status of the user's device, and may send the user a notification if the battery is too low for the application to function. The general movement of the user may be determined, and the rate of GPS updates may be slowed down when movement is recognized as inactive, such that power consumption of the device may be optimized. Again, an advantage may be that less network usage may be needed than, for example, needed for standard text messaging, and the speed of the device may be improved, and when user movement is detected, the GPS rate may be automatically reset to top speed to maintain best possible performance across the network. The GPS data may be combined with sensor data from the device to control the orientation, position, and scale, to create the appearance of any augmented data existing in the physical space being captured on the device display. Time of day modes may also be programmed into each dev kit to control independent versions of the same experience based on a user's location, time of day, or any other similar factors. The 3D render engine may also determine the device's position and implement gyroscope sensors and align the GPS heading to the device sensors. The 3D render engine may also parse augmented content data files for GPS data, and load each data file into MapTag in order to display the appropriate image or sound, and translate GPS data into XYZ coordinates. Next, it may locate the position of augmented content in the Flaregun ecosystem based on the position data in the data file. The 3D render engine may control the activation of network content, hyperlinks, SMS links, and other connectivity from the augmented data content with the internet.

The 3D render engine may be used for either a general user device user interface (step 3372), which may be accessed freely by any user with a compatible device to find friends and access map tags, or the 3D render engine may be used for an administrator user interface (step 3371, "TagAR"). The TagAR user interface may be accessed, for example, by vendors, advertisers, or any other users who wish to purchase ad space or tag locations in the Flaregun ecosystem and may do so through a secondary portal such as a web portal. The administrators or other users of the TagAR application may also add tags or advertisements by using the augmented reality features of the Flaregun application, and view their environment through a mobile device camera in order to add tags or advertisements. As an example, a vendor or merchant may access the Flaregun ecosystem through TagAR, and may manually add advertisements or points of interest.

Next, the 3D render engine may connect with an optional Flaregun WEBGL (Web Graphics Library) in order to provide preloaded data, images, graphics, or any other suitable content to the user (step 3347). Use of preloaded data may limit the need for accessing network data to provide content to the user, for example.

The server side codes may include the following exemplary codes. FlareVerse.php may store user data in a unique data file inside the UGN directory, and may update the data file based on current user activity. Scandir.php may scan the UGN directory and load data onto the user's device, and may scan the Flaregun vendor directory and load the data onto the user's device. CreateValid.php may procedurally create a valid UGN directory. Delete.php may delete a selected tag from the render engine, and may allow the application to continue to block a single user, and remove a tag from the environment using a dev kit. Deleteall.php may be used to delete all tags inside a UGN or vendor directory.

Figure 33C:
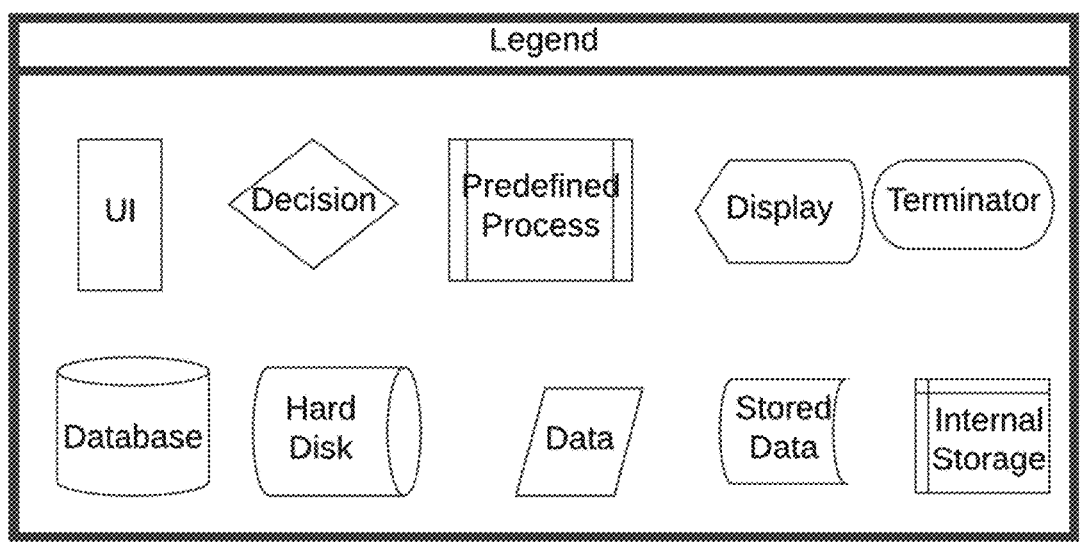
FIG. 33C is a legend for the items illustrated in the flow chart of FIGS. 33A-33B, according to an aspect.

FIG. 33C is a legend for the items illustrated in the flow chart of FIGS. 33A-33B, according to an aspect. As shown, various shapes are used to represent user interfaces, decisions, predefined processes, displays, terminators, databases, hard disks, data, stored data, and internal storage in the flow chart.

Figure 33D:
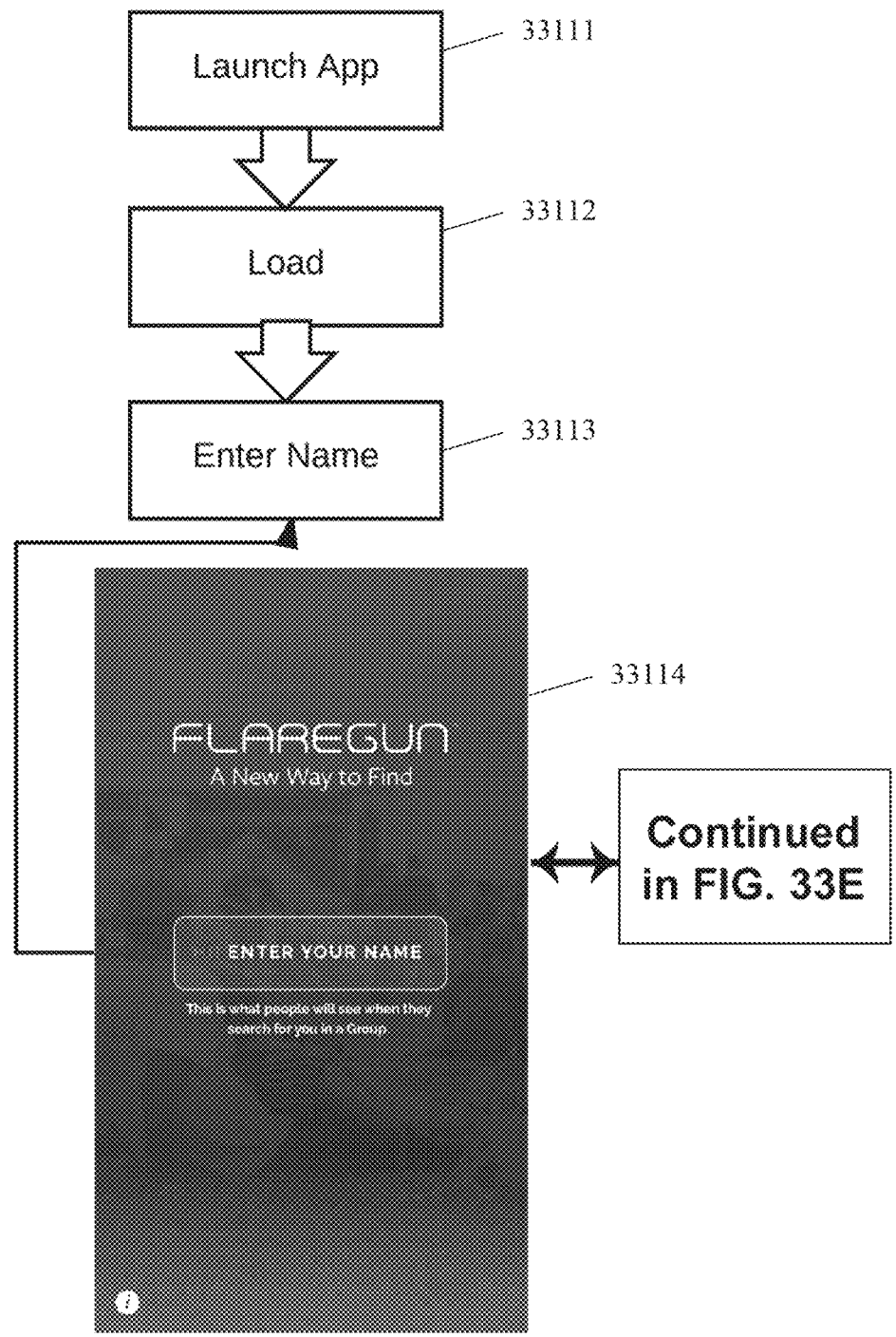
FIGS. 33D-33E is a flow chart showing exemplary steps in a user's experience with the application for visually connecting people, according to an aspect.
Figure 33E:
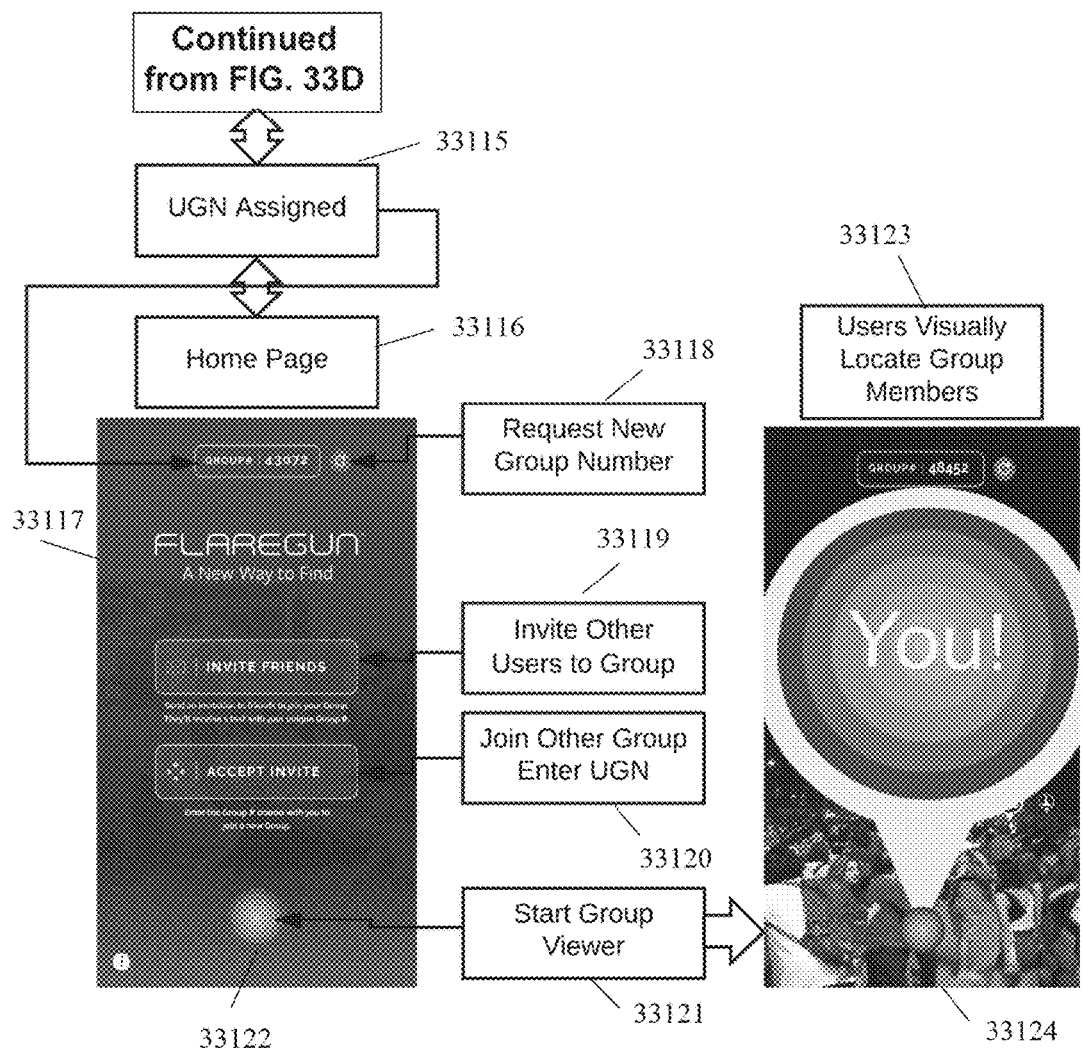

FIGS. 33D-33E is a flow chart showing exemplary steps in a user's experience with the application for visually connecting people, according to an aspect. First, a user may launch the application (step 33111). Next, the application may be loaded on the user's device (step 33112). Next, the user may be prompted by the application to enter their name (step 33113). An example of the user interface that may be presented to the user is shown in step 33114. Next, a unique group number may be randomly generated by the application and assigned to the user (step 33115). Next, the user may be taken to the application home page (step 33116). An example of the user interface for a home page that may be presented to the user is shown in step 33117. The home page may provide the user with various options. The user may request a new group number (step 33118). The user may also invite other users to join their group (step 33119). This may be done by the user sharing their group number with other individuals through, for example, standard text messaging such as SMS, or email, or any other suitable means. The user may also join any other group by entering the unique group number (step 33120). Next, the user may start the group viewer step 33121) by, for example, pressing a button on a mobile device touch screen (33122). Next, the user may use the application for visually locating group members (step 33123), by using the application's augmented reality features, device sensors, and device camera. An example of the user interface presented to the user for visually locating group members is shown in 33124.

Figure 34:
FIGS. 34-36 illustrate examples of user interfaces that may be shown during a loading or onboarding sequence of the application for visually connecting people, according to an aspect.
Figure 35:
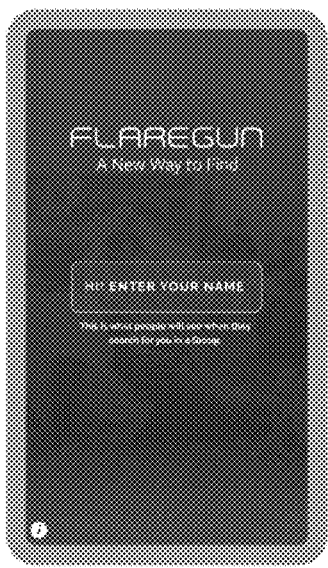
Figure 36:
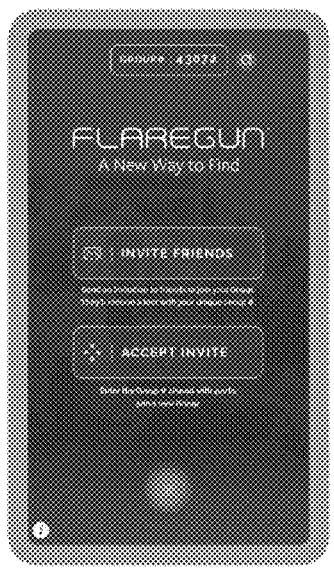
Figure 37:
FIGS. 37-40 illustrate examples of user interfaces that may be shown to a user while using the application for visually connecting people to find friends or group members, according to an aspect.

FIGS. 34-36 illustrate examples of user interfaces that may be shown during a loading or onboarding sequence of the application for visually connecting people, according to an aspect. First, a user may be shown a loading page (FIG. 34). Next, a user may be shown a prompt to enter their name (FIG. 35). Next, a user may be shown a home page with options for proceeding with a unique group number assigned to them (FIG. 36), as described when referring to FIGS. 33D-33E.

Figure 38:
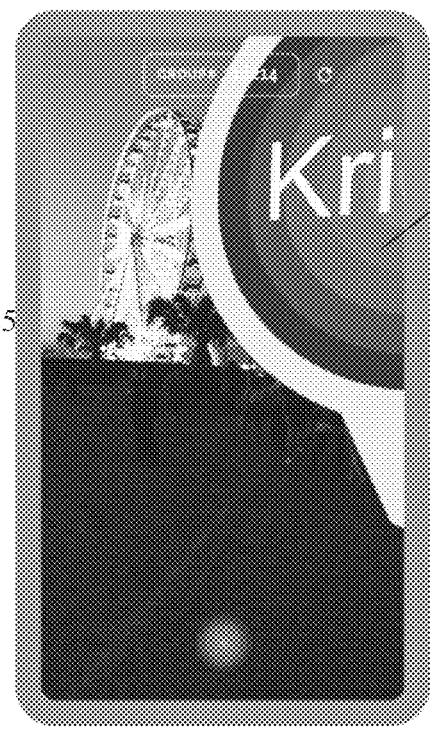
Figure 39:
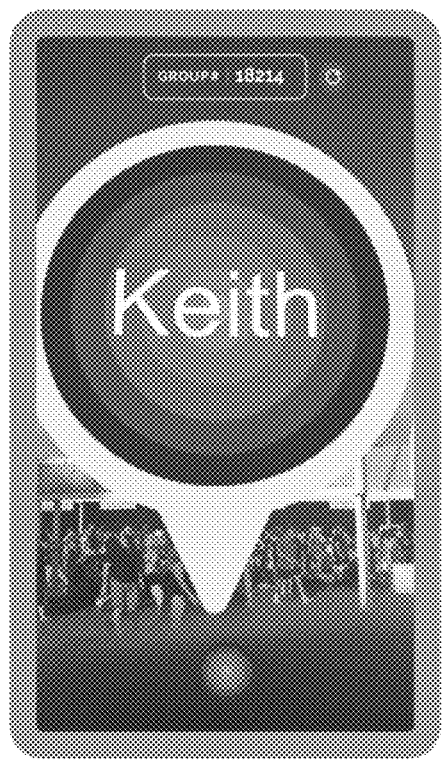
Figure 40:
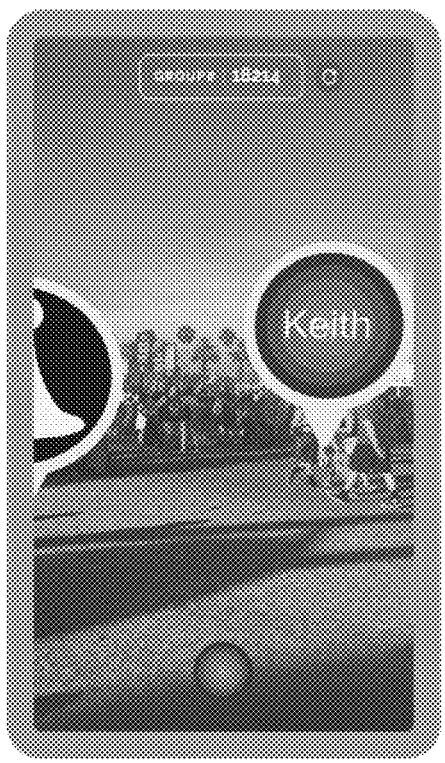

FIGS. 37-40 illustrate examples of user interfaces that may be shown to a user while using the application for visually connecting people to find friends or group members, according to an aspect. The user may be shown a smaller visual representation ("tag") 37125 of a friend or group member for an individual that is far away (FIG. 37, and a larger tag 38125 for an individual that is close by (FIG. 38). Users may assign certain preloaded images of graphics to individuals, which may be bundled or preloaded with the downloading of the application to the mobile device, without the need for loading of or linking to external profile pictures. When searching for another user, the application may find the GPS or coordinates of the user, and the code of the application may be designed such that the system points to the assigned graphic and name, and does not need to communicate with an external server or API in order to point to a string of data representing the found user. An advantage may be that the string may need a very low amount of data, such as approximately 13-18 bytes, for example. As an example of a comparison, text messaging with approximately 140 characters may use approximately 125 KB of data. Again, the user may first download the application to their mobile device, and the application may contain all necessary code for running the application. Light code such as for pointing to another found user's location may be provided within the application.

Figures 41, 42, 43:
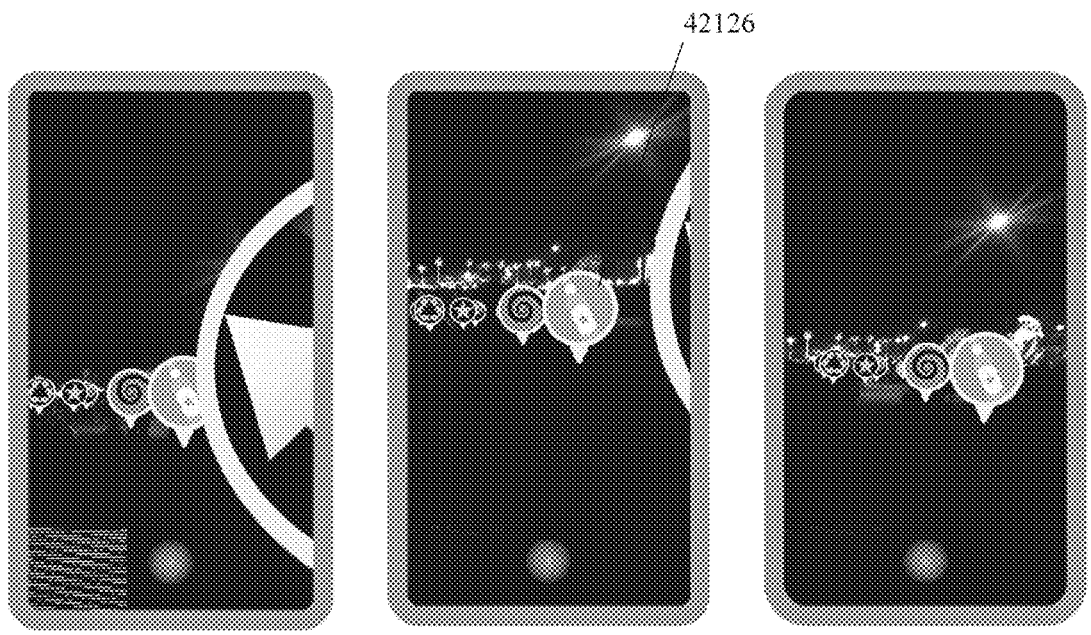
FIGS. 41-43 illustrate examples of user interfaces that may be shown to a user while using the application for visually connecting people to view tagged points of interest, according to an aspect.
Figure 44:
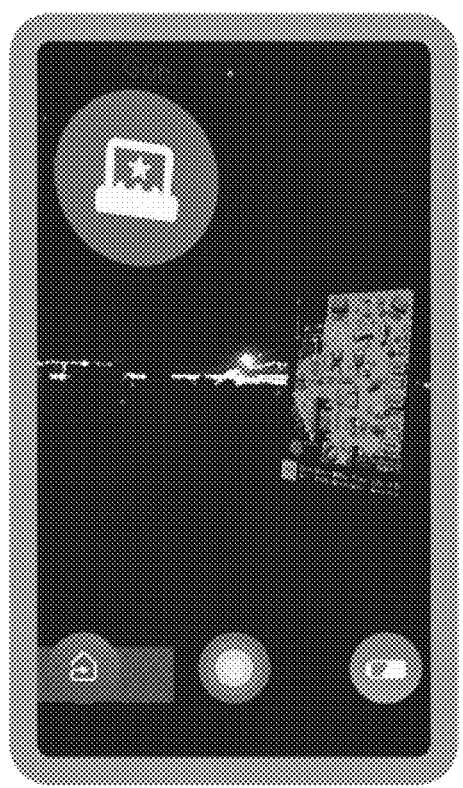
FIGS. 44-47 illustrate examples of user interfaces that may be presented to the user when using the application for visually connecting people to view advertisements, according to an aspect.
Figure 45:
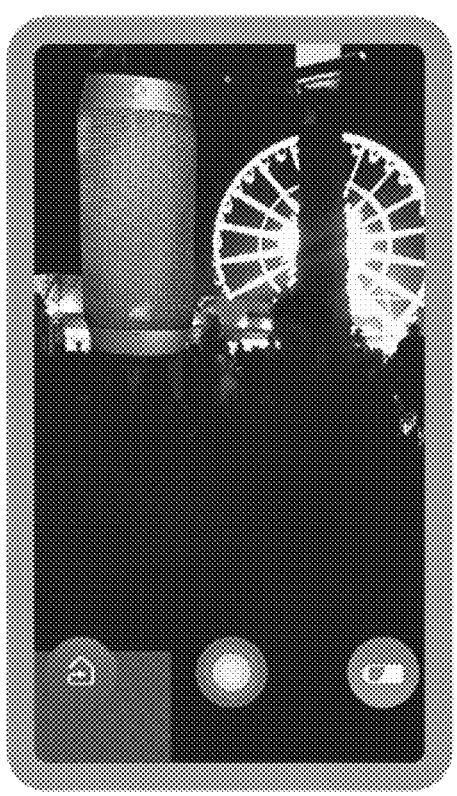
Figure 46:
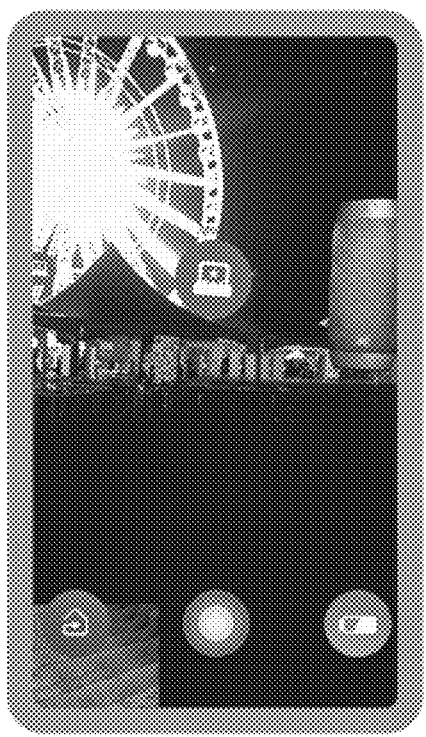
Figure 47:
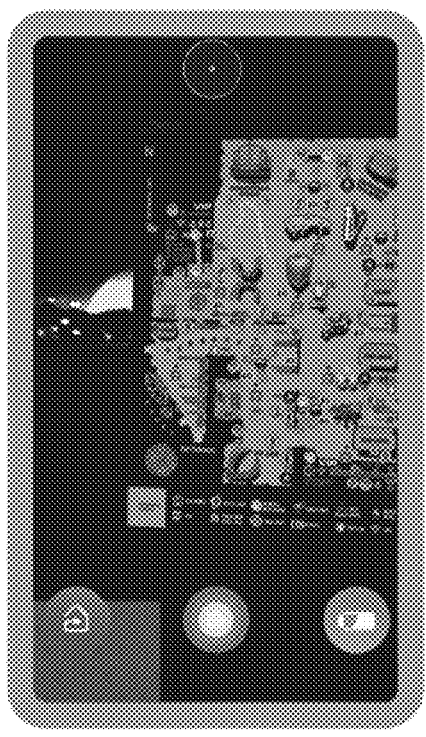

FIGS. 41-43 illustrate examples of user interfaces that may be shown to a user while using the application for visually connecting people to view tagged points of interest, according to an aspect. The user may be shown points of interest through the camera viewfinder with the application's augmented reality features, and be displayed as visual indicators ("tags," or "Map tags") such as 42126. The user may be able to use the application to walk towards a selected point of interest, such as restrooms, restaurants, tourist attractions, ATMs, and so on.

FIGS. 44-47 illustrate examples of user interfaces that may be presented to the user when using the application for visually connecting people to view advertisements, according to an aspect. Similar to points of interest described when referring to FIGS. 41-43, advertisements may be marked or tagged in the augmented reality of the application ecosystem and shown by visual indicators and may be referred to as tags, or Ad Tags. Viewing an environment through the camera of the user's mobile device with the application's augmented reality features incorporated may show such tagged advertisements. A vendor, advertiser, or merchant may access the Flaregun ecosystem through a partner application ("TagAR") in order to tag or mark areas with advertisements. The tagged locations may be associated with the advertised product, for example. A third party device may also be used for adding or inserting content to the AR space. As an example, any device with a processor, GPS, and network connectivity may be used by a third party with administrative access, to add data of the Flaregun user environment. Adding data to the system may be unavailable for general users without administrative access or capabilities. As an example, users accessing the Flaregun ecosystem for free may be able to view all content, but may not have the ability to add content, and users with paid access may be able to add and view content.

Figure 48:
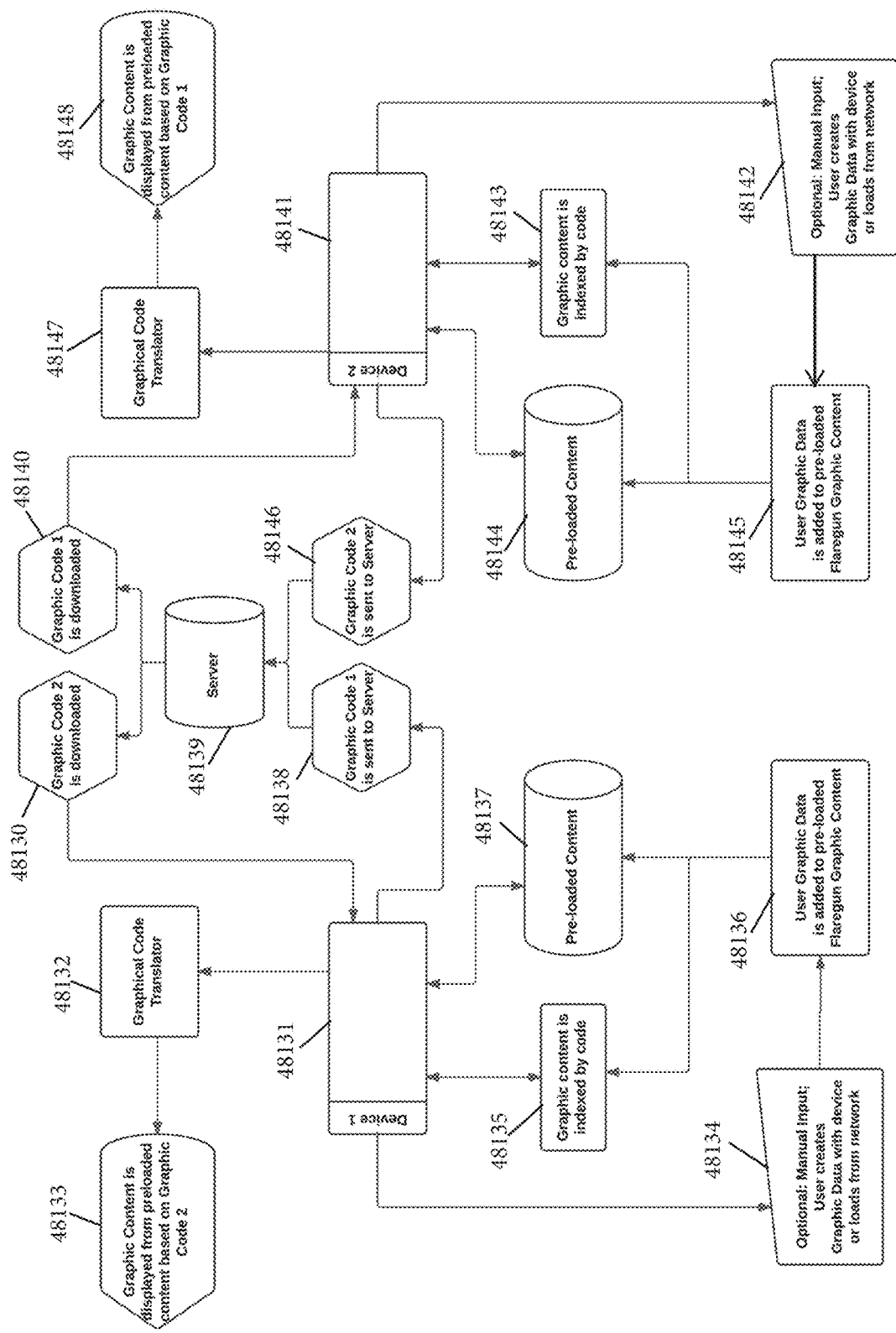
FIG. 48 is a flow chart showing a method of utilizing preloaded and user-generated content for low data usage, according to an aspect.

FIG. 48 is a flow chart showing a method of utilizing preloaded and user-generated content for low data usage, according to an aspect. Preloaded and user-generated content as well as the application's location and tag data may be used for displaying content in the application without the need for transmitting the content through a web server. By coding a system of identification into the Flaregun platform, a small amount of data may be sent to a device instructing it to find a specific image on a user's device, or image embedded in the Flaregun application, and position it in virtual space and render it accordingly, using, for example, a 3D render engine. By reducing the need to upload graphic images to the server, average tag data rate of transfer may be lowered by a significant amount, as compared to transferring tag data through a server and to another device. Data transfer may be reduced by approximately 98%+/- by replacing a user avatar or downloaded image with a preloaded image displayed in real time through the coded system. The graphics may be embedded in the application and may come preloaded when the user downloads the application to their mobile device, or the user may create an image to be stored in the application. The user may activate the application for visually connecting people ("Flaregun") and a geolocation algorithm ("MapTag," to be discussed further when referring to FIG. 49) may run, and the user's location data may be encoded with graphics data to be used when displayed on other receiving devices. As MapTag continues to run, location data including graphics data may be received. MapTag may then use the graphics data to change the surface appearance of the model or artwork of the tag in focus. For device-to-device communication, the following exemplary process may take place. First, graphics codes may be downloaded. One set ("graphic code 2," step 48130) may be downloaded to a first device (step 48131), and another set ("graphic code 1," step 48140) may be downloaded to a second device (step 48141). The graphic content may be indexed by code (step 48135, step 48143), and there may next be an optional step of manual input, wherein the user may create graphic data with the device or by loading from the network (step 48134, step 48142). Next, the user graphic data may be added to the preloaded Flaregun graphic content library (step 48136, step 48145) and stored as part of the library (step 48137, step 48144). This optionally created data may also be indexed by code (step 48135, step 48143). The graphics codes may also be received from the server (step 48139). The data may be then be saved to the user's devices (step 48131, step 48141). Graphic code 1 and graphic code 2 may then be sent to the server (48138, step 48146) for storage. The user's devices may then receive graphic codes from the server and may afterwards skip the step of communicating with the server, and instead point to downloaded graphic code on the device when the graphic code is needed or retrieved. The device may use a graphical code translator (step 48132, step 48147) and then, on the device, display the graphic content from the preloaded content based on the downloaded code (step 48133, step 48148).

Figure 49:
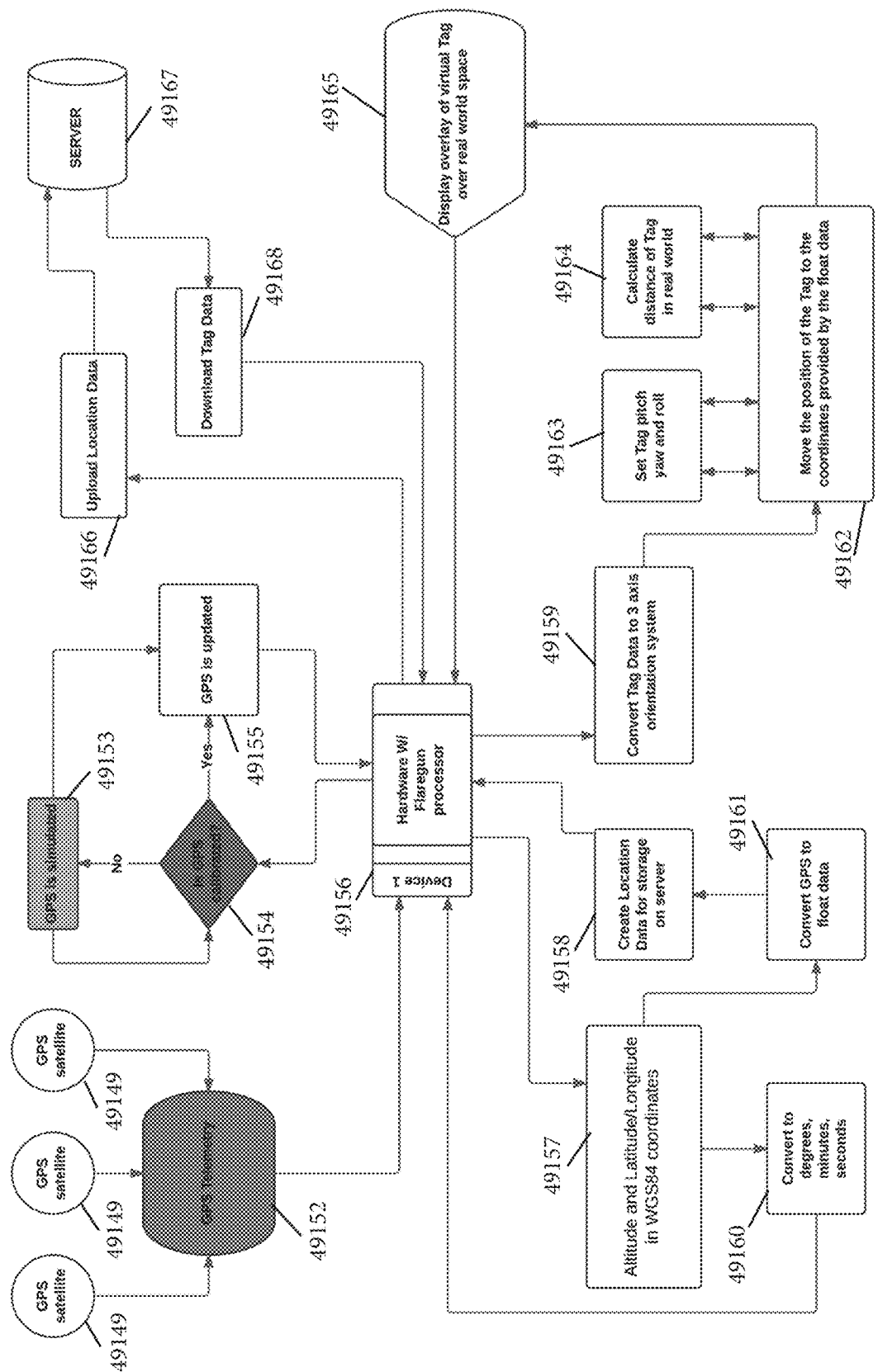
FIG. 49 is a flow chart showing the process for the geolocation algorithm of the application for visually connecting people, according to an aspect.

FIG. 49 is a flow chart showing the process for the geolocation algorithm of the application for visually connecting people ("MapTag"), according to an aspect. The geolocation algorithm MapTag may be designed to transmit and receive data to a server or to another device specifically related to translating GPS positioning data into virtual space coordinates. The process may run on any suitable device with a processor, GPS sensor, and network access. First, MapTag may activate a real time render engine, which may be designed as known in the art. MapTag may also activate the device's GPS sensors, and find the telemetry (step 49152), and may use a plurality of GPS satellites to do so (step 49149). The device may begin GPS features and simulate GPS (step 49153) and check whether the GPS is calibrated (step 49154). If not, the process may begin again to restart GPS features (step 49153) and calibrate the GPS. If GPS is calibrated, then the user's GPS location may be updated (step 49155). Next, the algorithm may begin looping on the device or other hardware having a Flaregun processor (step 49156). As an example, altitude and latitude and longitude in WGS84 coordinates may be used (step 49157). These may next be converted to degrees, minutes, and seconds (step 49160) and saved to the device (step 49156). The current status of the GPS data may be checked, and may be parsed into a float variable or float data (step 49161). This may next be converted into a location data string for use or storage on the Flaregun server (step 49158). Next, the data may be saved to the device (step 49156). Next, the virtual position of the user's point of view may be moved into real time to the corresponding position based on the location data. Next, the location data may be uploaded (step 49166) to the Flaregun server (step 49167). Next, user profile data may be found, and the corresponding tag data based on the found user profile may be downloaded, and the tag data may be translated into a 3-axis orientation system (step 49159), and a 3-axis location may be generated. Next, the virtual position of the tag may be moved in real time to that location, by moving the position of the tag to the coordinates provided by the float data (step 49162). Next, the heading data from the device sensor may be calibrated and the distance of the tag in the real world may be calculated (step 49164), and the virtual position of the user's point of view may be moved to the rotation angle of the sensor data by setting the tag pitch, yaw, and roll of the position (step 49163). Next, the tag may be rendered over a background camera or virtual environment, and the rendering may be based on the application design use (step 49165), and may be viewed on the user's device (step 49156).

Figure 50:
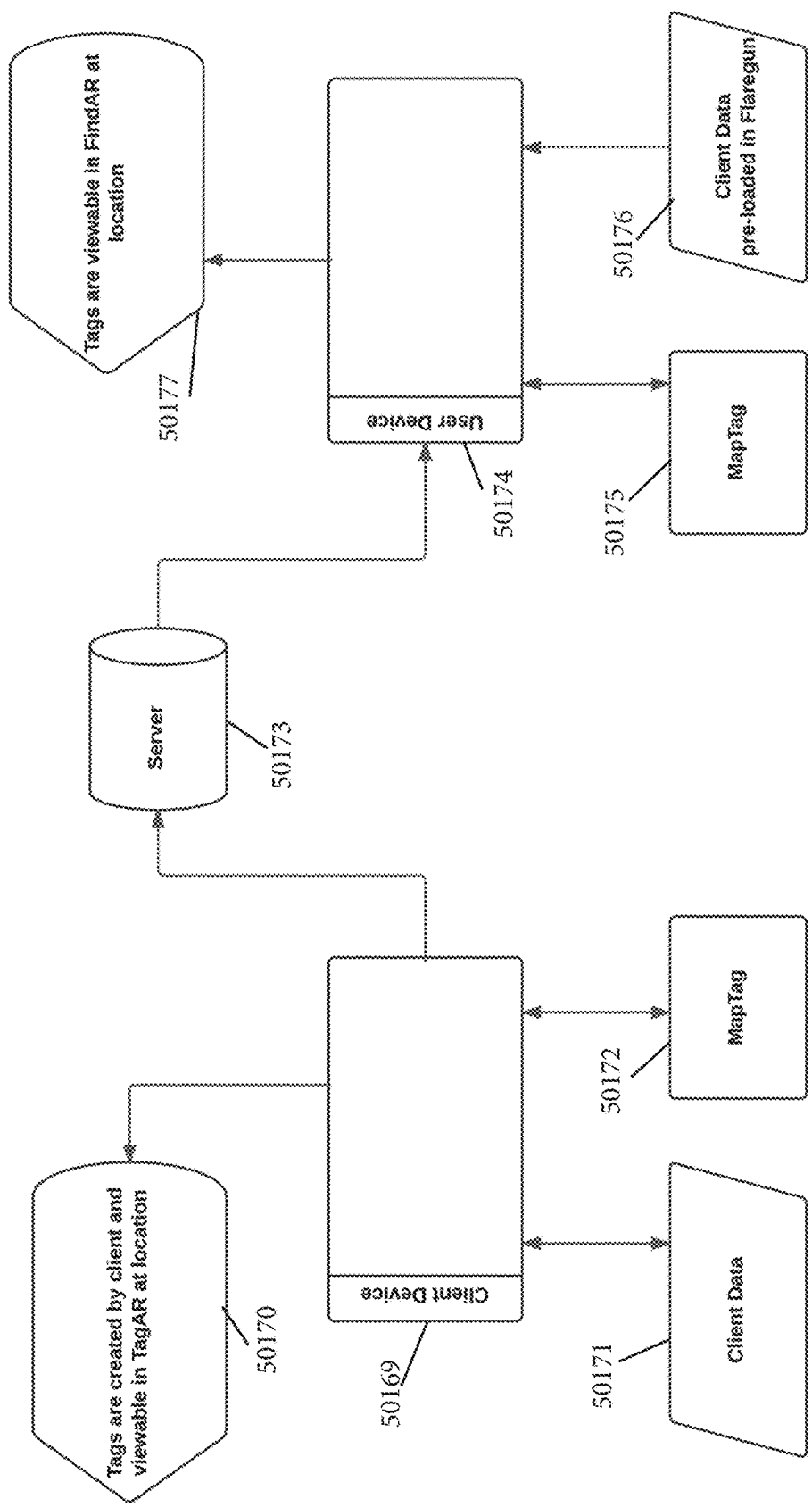
FIG. 50 is a flow chart showing the process for tagging points of interest within the ecosystem for the application for visually finding people, according to an aspect.

FIG. 50 is a flow chart showing the process for tagging points of interest within the ecosystem for the application for visually finding people, according to an aspect. A partner application ("TagAR") accessible by vendors, merchants, and advertisers ("client") may be used for tagging points of interest or adding advertisements to the augmented reality ecosystem, for example. The client device (step 50169) may be used for accessing and providing client data (step 50171) for the MapTag system for geolocation algorithms (step 50172). Tags used for marking or showing advertisements on certain geographical locations may be created by the client such that new content can be added to the ecosystem, and may be viewable by users of the application at those locations (step 50170) after the client sends the data to the server (step 50173). The user may access the application through their user device (step 50174) and be provided with MapTag data (step 50175) and client data preloaded in the Flaregun application (step 50176), which may be received from the server or may be preloaded when the user downloads the application to their mobile device. The marked tags may then be viewable to the user when using the application ("FindAR," "Flaregun," or "application for visually connecting people," step 50177).

Figure 51:
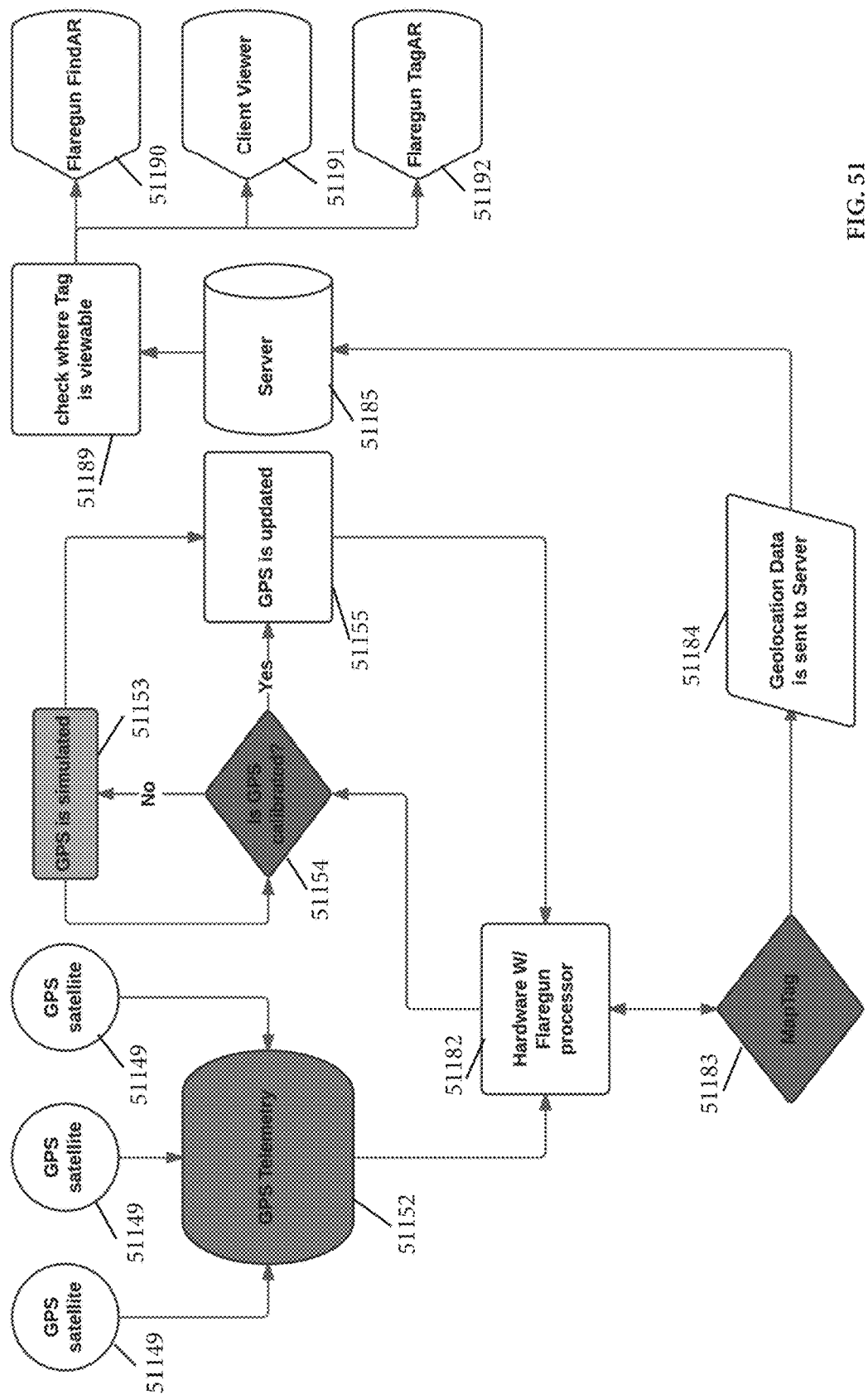
FIG. 51 is a flow chart showing an exemplary process for hardware having a processor for the application for visually connecting people, according to an aspect.

FIG. 51 is a flow chart showing an exemplary process for hardware having a processor for the application for visually connecting people ("Flaregun processor"), according to an aspect. A hardware transponder may, for example, be linked to the system for visually connecting people, and may allow for geolocation capabilities from an embedded chip. As an example, a wristband or any other similar wearable object may be used for holding the embedded chip. Similar to the geolocation algorithm being run on a mobile device, the process may be run with any hardware having the Flaregun processor. Again, the geolocation algorithm MapTag may be designed to transmit and receive data to a server or to another device specifically related to translating GPS positioning data into virtual space coordinates. First, MapTag may activate a real time render engine, which may be designed as known in the art. MapTag may also activate the device's GPS sensors, and find the telemetry (step 51152), and may use a plurality of GPS satellites to do so (step 51149). The device may begin GPS features and simulate GPS (step 51153) and check whether the GPS is calibrated (step 51154). If not, the process may begin again to restart GPS features (step 51153) and calibrate the GPS. If GPS is calibrated, then the user's GPS location may be updated (step 51155). Next, the algorithm may begin looping (step 51183) on the hardware having a Flaregun processor (step 51182). Geolocation data of the hardware may be sent to the server (step 51184) and may be stored on the server (step 51185). The server may run processes to check where the location tag has occurred or where it is viewable (step 51189) and may then make the tag accessible or viewable through various platforms, such as, for example, a general free application for users ("FindAR," "Flaregun," "Flaregun FindAR," step 51190), or a client viewer such as a web portal used by clients to access the Flaregun ecosystem (step 51191), or a client application ("TagAR," "Flaregun TagAR," step 51192).

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A mobile device comprising a processor, a display, a camera, a location sensor, an orientation sensor, and an application for visually connecting people configured for minimized network data usage by having a set of preloaded graphics and by being configured to receive a first set of graphic codes from a server, the first set of graphic codes comprising instructions for displaying at least a graphic from the set of preloaded graphics, and comprising processor-executable instructions stored on a non-transitory processor-readable media that when executed by the processor, enables the mobile device to perform operations comprising: detecting a location of a user of the mobile device; receiving the first set of graphic codes from the server and sending a second set of graphic codes via the server to another user, the second set of graphic codes comprising instructions for displaying the at least a graphic from the set of preloaded graphics; performing a live scanning of the user's surroundings with the camera to detect a location of a member of a group, which the user is a member of, the group member having their own mobile device having the application for visually connecting people; determining what the camera points to during the live scanning using the orientation sensor and the location sensor; and, if the group member is detected during the live scanning of the surroundings with the camera due to the group member having a location corresponding with a point in a direction the camera points to at a particular moment during the live scanning, displaying on the display a live image of the surroundings as captured by the camera during the live scanning and a representation of the group member's location, the representation comprising the at least a graphic of the set of preloaded graphics as instructed by the first set of graphic codes superimposed over the live image, without further contact with the server.

2. The mobile device of claim 1, the operations further comprising: assigning a unique group number to the group the user is a member of, providing the user with the ability to leave the group, join a new group, or share the unique group number with at least a second user as an invitation to join the group.

3. The mobile device of claim 1, the operations further comprising: activating a real time 3D render engine, activating the mobile device's GPS sensors, obtaining altitude, latitude, and longitude information from the location of the user detected by the mobile device and converting the location of the user into GPS coordinates and into a location data string for transmission to the group member's mobile device or for storage on the server for retrieval by the group member's mobile device.

4. The mobile device of claim 1 wherein the group member's representation further comprises a video, audio or text chat button, which the user may actuate to commence communication with the group member or with other group members, simultaneously.

5. The mobile device of claim 1, further comprising a plurality of representations of group members' locations within the live image and fading and downsizing some of the displayed group members' representations during the live scanning, according to each one of the group member's distance from the user's mobile device.

6. A method for visually finding and interacting with people with minimized network data usage, operable on a computing system including a mobile device comprising a processor, a display and a camera, the method comprising:
   downloading to the mobile device an application for visually connecting people configured for minimized network data usage by having a set of preloaded graphics and by being configured to receive a first set of graphic codes from a server, the first set of graphic codes comprising instructions for displaying a graphic of the set of preloaded graphics;
   receiving the first set of graphic codes from the server;
   detecting a location of a user of the mobile device;
   sending a second set of graphic codes via the server to another user, the second set of graphic codes comprising instructions for displaying the graphic of the set of preloaded graphics;
   detecting, by performing a live scanning of the user's surroundings with the camera, a location of a member of a group, which the user is a member of, the group member having their own mobile device having the application for visually connecting people, and, if the group member is detected during the live scanning of the user's surroundings, displaying on the mobile device's display a live image of the surroundings as captured by the camera during the live scanning; and displaying on the live image a representation of the group member's location, the representation comprising the graphic of the set of preloaded graphics as instructed by the first set of graphic codes without further contact with the server.

7. The method of claim 6, further comprising the steps of:
activating a real time 3D render engine;
activating the mobile device's GPS sensors;
obtaining altitude, latitude, and longitude information from the location of the user detected by the mobile device; and
converting the location of the user into GPS coordinates and into a location data string for transmission to the group member's mobile device or for storage on the server for retrieval by the group member's mobile device.

8. The method of claim 7, wherein the group member has a location corresponding with a point in a direction the camera points to at a particular moment during the live scanning, the point having location coordinates corresponding with a current location of the group member's mobile device.

9. The method of claim 6, further comprising the steps of:
assigning a unique group number to the group the user is a member of; and
providing the user with the ability to leave the group, join a new group, or share the unique group number with at least a second user as an invitation to join the group.

10. The method of claim 6, further comprising a plurality of representations of group members' locations within the live image, the method further comprising the step of:
fading and downsizing some of the displayed group members' representations during the live scanning, according to each one of the group member's distance from the user's mobile device.

11. The method of claim 6, wherein the representation further comprises a video, audio or text chat button, which the user may actuate to interact in real time with the group member or with other group members, simultaneously.

12. The method of claim 6, further comprising a plurality of visual tags, each one of the visual tags corresponding with a physical location and being represented on the live image of the surroundings by a tag graphic from the set of preloaded graphics.

13. The method of claim 12, wherein at least one of the visual tags is a marker for a point of interest for the user in the user's surroundings.

14. The method of claim 12, wherein at least one of the visual tags is an advertisement.

\* \* \* \* \*